US008838452B2

(12) United States Patent
Kan et al.

(10) Patent No.: US 8,838,452 B2
(45) Date of Patent: Sep. 16, 2014

(54) EFFECTIVE AUDIO SEGMENTATION AND CLASSIFICATION

(75) Inventors: Reuben Kan, Kellyville (AU); Dmitri Katchalov, Neutral Bay (AU); Muhammad Majid, Carlton (AU); George Politis, Ryde (AU); Timothy John Wark, The Gap (AU)

(73) Assignee: Canon Kabushiki Kaisha, Tokyo (JP)

(*) Notice: Subject to any disclaimer, the term of this patent is extended or adjusted under 35 U.S.C. 154(b) by 2026 days.

(21) Appl. No.: 11/578,300

(22) PCT Filed: Jun. 6, 2005

(86) PCT No.: PCT/AU2005/000808
§ 371 (c)(1),
(2), (4) Date: Sep. 8, 2008

(87) PCT Pub. No.: WO2005/122141
PCT Pub. Date: Dec. 22, 2005

(65) Prior Publication Data
US 2009/0006102 A1 Jan. 1, 2009

(30) Foreign Application Priority Data
Jun. 9, 2004 (AU) ................................ 2004903132

(51) Int. Cl.
*G10L 15/00* (2013.01)
*G10L 15/04* (2013.01)
*G10L 25/00* (2013.01)

(52) U.S. Cl.
CPC ..................................... *G10L 25/00* (2013.01)
USPC ........................... 704/270; 704/238; 704/253

(58) Field of Classification Search
USPC ......... 704/236, 238, 240, 245, 270, 231, 253; 707/104.1
See application file for complete search history.

(56) References Cited

U.S. PATENT DOCUMENTS 5,862,519 A * 1/1999 Sharma et al. ................ 704/231
6,421,645 B1 7/2002 Beigi et al. .................... 704/272
6,714,909 B1 * 3/2004 Gibbon et al. ................ 704/246
6,801,895 B1 * 10/2004 Huang et al. .................. 704/270

(Continued)

FOREIGN PATENT DOCUMENTS

GB 2 351 592 1/2001

OTHER PUBLICATIONS

Lu et al. "Content-Based Audio Classification and Retrieval by Support Vector Machines". IEEE Transaction on Neural Networks, 14(1), 2003, pp. 209-215.*

(Continued)

*Primary Examiner* — James Wozniak
(74) *Attorney, Agent, or Firm* — Fitzpatrick, Cella, Harper & Scinto

(57) ABSTRACT

A method (400) and system (200) for classifying a audio signal are described. The method (400) operates by first receiving a sequence of audio frame feature data, each of the frame feature data characterising an audio frame along the audio segment. In response to receipt of each of the audio frame feature data, statistical data characterising the audio segment is updated with the received frame feature data. The received frame feature data is then discarded. A preliminary classification for the audio segment may be determined from the statistical data. Upon receipt of a notification of an end boundary of the audio segment, the audio segment is classified (410) based on the statistical data.

23 Claims, 11 Drawing Sheets

(56) References Cited

U.S. PATENT DOCUMENTS

| | | | | |
|---|---|---|---|---|
| 6,879,951 | B1 * | 4/2005 | Kuo | 704/10 |
| 6,901,362 | B1 * | 5/2005 | Jiang et al. | 704/214 |
| 7,072,508 | B2 * | 7/2006 | Dance | 382/167 |
| 7,143,353 | B2 * | 11/2006 | McGee et al. | 715/723 |
| 7,243,063 | B2 * | 7/2007 | Ramakrishnan et al. | 704/215 |
| 7,337,115 | B2 * | 2/2008 | Liu et al. | 704/246 |
| 7,346,516 | B2 * | 3/2008 | Sall et al. | 704/500 |
| 7,389,230 | B1 * | 6/2008 | Nelken | 704/255 |
| 7,409,407 | B2 * | 8/2008 | Radhakrishnan et al. | 1/1 |
| 2002/0029144 | A1 * | 3/2002 | Huang et al. | 704/233 |
| 2003/0086541 | A1 * | 5/2003 | Brown et al. | 379/88.01 |
| 2003/0097269 | A1 | 5/2003 | Wark | 704/500 |
| 2003/0231775 | A1 | 12/2003 | Wark | 381/56 |
| 2004/0030550 | A1 * | 2/2004 | Liu et al. | 704/231 |
| 2004/0210436 | A1 | 10/2004 | Jiang et al. | 704/222 |

OTHER PUBLICATIONS

Biatov et al. "An Audio Stream Classification and Optimal Segmentation for Multi-media Application"s. In Proc. of the 11th ACM International Conference on Multimedia, 2003, pp. 211-214.*

Ponte et al. "Text segmentation by topic." Research and Advanced Technology for Digital Libraries. Springer Berlin Heidelberg, 1997, pp. 113-125.*

S.S. Chen et al, "Speaker, Environment and Channel Change Detection and Clustering Via the Bayesian Information Criterion", Proc. DARPA Broadcast News Transcription and Understanding Workshop, pp. 127-132, Feb. 1998.

PCT International Search Report in corresponding International Application No. PCT/AU2005/000808, dated Jul. 15, 2005.

* cited by examiner

EFFECTIVE AUDIO SEGMENTATION AND CLASSIFICATION

FIELD OF THE INVENTION

The present invention relates generally to audio signal processing and, in particular, to efficient methods of segmenting and classifying audio streams.

BACKGROUND

The ability to subdivide an audio stream into segments containing samples from a source having constant acoustic characteristic, such as from a particular human speaker, a type of background noise, or a type of music, and then to classify each homogeneous segment into one of a number of categories lends itself to many applications. Such applications include listing and indexing of audio libraries in order to assist in effective searching and retrieval, speech and silence detection in telephony and other modes of audio transmission, and automatic processing of video in which some level of understanding of the content of the video is aided by identification of the audio content contained in the video.

Past work in this area has focused on indexing audio databases, where performance and memory constraints are relaxed. Real-time methods are most commonly specific to speech detection and speech recognition, and are not designed to work with arbitrary audio models. Model-based segmentation methods, such as those using Hidden Markov Models (HMMs), efficiently segment and classify audio, but have difficulties dealing with audio that does not match any predefined model. In addition, segmentation boundaries are limited to boundaries between regions of different classification. It is desirable to separate segmentation and classification, but doing so using known methods results in an unacceptable delay in reporting classifications for detected segments.

A successful approach for segmenting audio that has been used is the Bayesian Information Criterion (BIC). The BIC is a classical statistical approach for assessing the suitability of a distribution for a set of sample data. When applied to audio segmentation, the BIC is used to determine whether a segment of audio is better described by one distribution or two (different) distributions, hence allowing a segmentation decision to be made. It is possible to perform a second BIC-based segmentation pass over the resulting segmentation in order to eliminate segment boundaries that are not deemed statistically significant. A disadvantage of such an approach is that the second BIC-based segmentation pass needs the original data on which the first segmentation was based, requiring storage for data of indefinite length.

SUMMARY OF THE INVENTION

It is an object of the present invention to substantially overcome, or at least ameliorate, one or more disadvantages of existing arrangements.

According to an aspect of the invention, there is provided a method of classifying a signal segment, said method comprising the steps of:

(a) receiving a sequence of frame feature data, each of said frame feature data characterising a frame of data along said signal segment;

(b) in response to receipt of each of said frame feature data, updating statistical data, characterising said signal segment, with the received frame feature data;

(c) receiving a notification of an end boundary of said signal segment; and (d) classifying said signal segment based on said statistical data.

According to another aspect of the invention there is provided a method of classifying segments of a signal, said method comprising the steps of:

(a) receiving a sequence of segmentation frame feature data, each of said frame feature data characterising a frame of data along said signal;

(b) in response to receipt of each of said frame feature data of a current segment, updating current statistical data, characterising said current segment, with the received frame feature data;

(c) receiving a notification of an end boundary of said current segment;

(d) in response to receipt of said notification, comparing said current statistical data with statistical data characterising a preceding segment; and (e) merging current and preceding segments, or classifying said preceding signal segment based on said statistical data characterising said preceding segment, based upon the difference between said current statistical data and said statistical data characterising said preceding segment.

According to yet another aspect of the invention there is provided a method for processing an audio signal comprising the steps of:

(a) providing a plurality of predetermined, pre-trained models;

(b) providing an audio signal for processing in accordance with said models;

(c) segmenting said audio signal into homogeneous portions whose length is not limited by a predetermined constant; and (d) classifying at least one of said portions with reference to at least one of said models;

wherein said segmenting step is performed independently of said classifying step, and step of classifying a homogeneous portion begins before segmenting step has identified the end of said portion.

According to another aspect of the invention there is provided a method of segmenting an audio signal into a series of homogeneous portions comprising the steps of:

receiving input consisting of a sequence of frames, each frame consisting of a sequence of signal samples;

calculating feature data for each said frame, forming a sequence of calculated feature data each corresponding to one of said frames;

in response to receipt of each said calculated feature data of a current segment, updating current statistical data with the received frame feature vector, said current statistical data characterising said current segment;

determining a potential end boundary for the current segment;

in response to determining a potential end boundary, comparing said current statistical data with statistical data characterising a preceding segment; and merging said current and preceding segments or accepting said preceding segment as a completed segment, based upon the difference between said current statistical data and said statistical data characterising said preceding segment.

According to another aspect of the invention there is provided a method of segmenting an audio signal into a series of homogeneous portions comprising the steps of:

receiving input consisting of a sequence of frames, each frame consisting of a sequence of signal samples;

calculating a feature for each said frame, forming a sequence of calculated features each corresponding to one of said frames, wherein said feature is the product of the energy value of a frame with a weighted sum of the bandwidth and the frequency centroid of a frame; and detecting transition points in the sequence of calculated features using BIC over subsequences of calculated features, said transition points delineating homogeneous segments.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
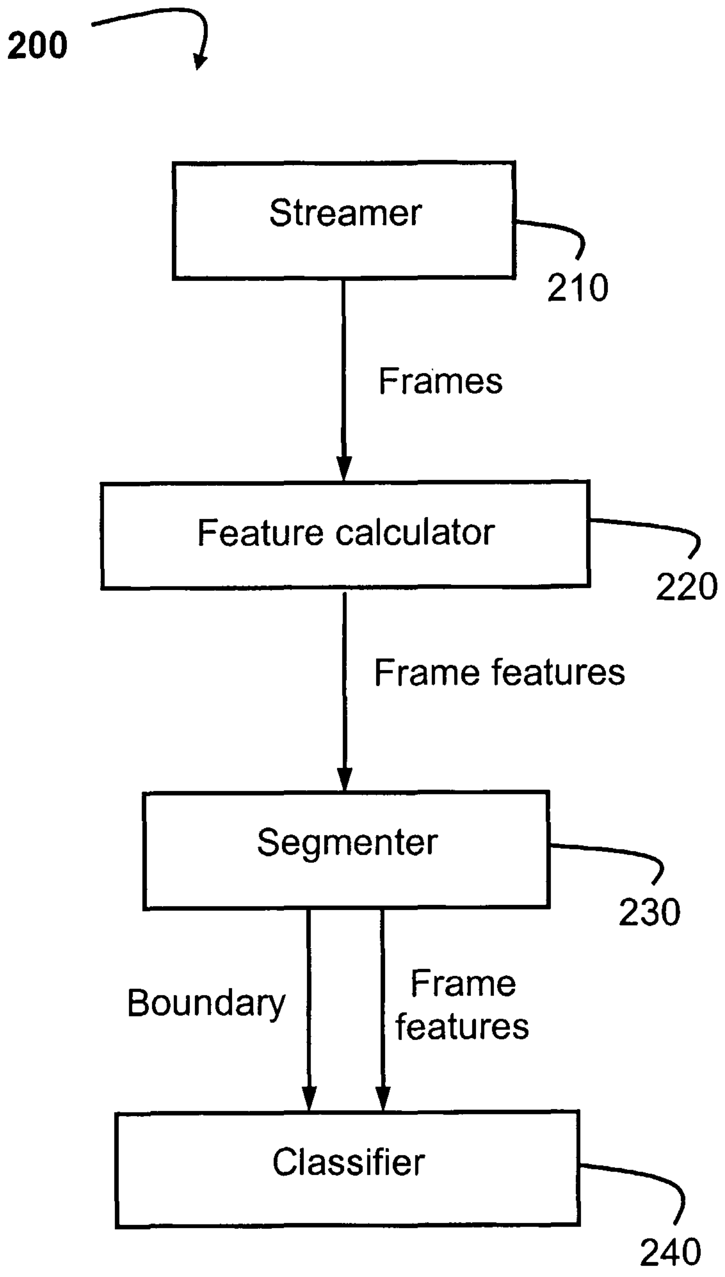
FIG. 1 shows a schematic block diagram of a single-pass segmentation and classification system.

Some portions of the description which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that the above and similar terms are to be associated with the appropriate physical quantities and are merely convenient labels. Unless specifically stated otherwise, and as apparent from the following, it will be appreciated that throughout the present specification, discussions refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a single-pass segmentation and classification system 200 for segmenting an audio stream in the form of a sequence x(n) of sampled audio from unknown origin into homogeneous segments, and then classifying those homogeneous segments to thereby assign to each homogeneous segment an object label describing the sound contained within the segment. Segmentation may be described as the process of finding transitions in an audio stream such that data contained between two transitions is substantially homogeneous. Such transitions may also be termed boundaries, with two successive boundaries respectively define the start and end points of a homogeneous segment. Accordingly, a homogeneous segment is a segment only containing samples from a source having constant acoustic characteristics.

Figure 2:
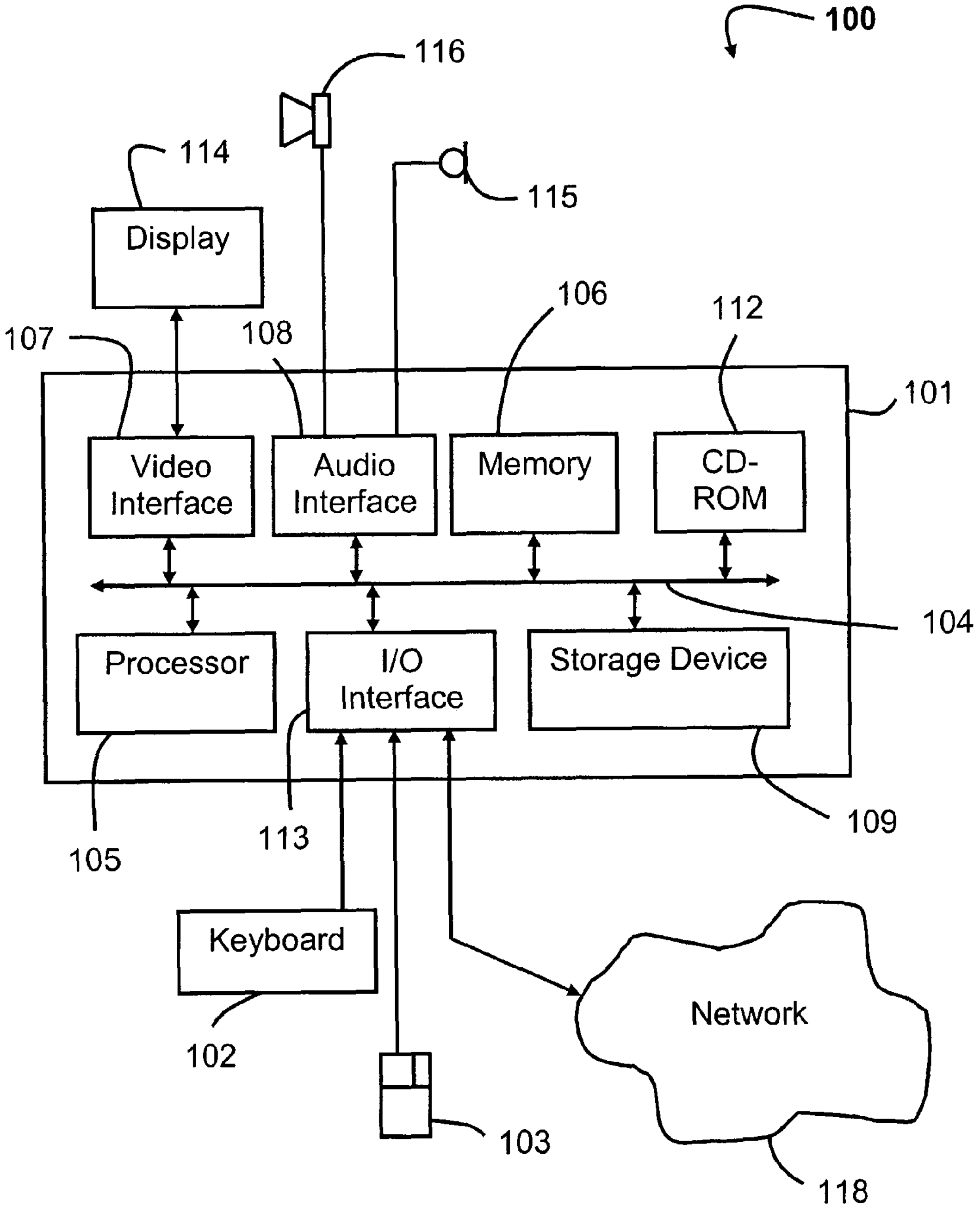
FIG. 2 shows a schematic block diagram of a general-purpose computer upon which the segmentation and classification systems described herein may be practiced.

FIG. 2 shows a schematic block diagram of a general-purpose computer 100 upon which the single-pass segmentation and classification system 200 may be practiced. The computer 100 comprises a computer module 101, input devices including a keyboard 102, pointing device 103 and a microphone 115, and output devices including a display device 114 and one or more loudspeakers 116.

The computer module 101 typically includes at least one processor unit 105, a memory unit 106, input/output (I/O) interfaces including a video interface 107 for the video display 114, an I/O interface 113 for the keyboard 102, the pointing device 103 and interfacing the computer module 101 with a network 118, such as the Internet, and an audio interface 108 for the microphone 115 and the loudspeakers 116. A storage device 109 is provided and typically includes a hard disk drive and a floppy disk drive. A CD-ROM or DVD drive 112 is typically provided as a non-volatile source of data. The memory unit 106, storage device 109, as well as CD-ROM and DVD, insertable into the drive 112, are examples of non-transitory computer readable media upon which a software program, executable by the processor unit 105 can be recorded. The components 105 to 113 of the computer module 101, typically communicate via an interconnected bus 104 and in a manner which results in a conventional mode of operation of the computer module 101 known to those in the relevant art.

One or more of the modules of the single-pass segmentation and classification system 200 may alternatively be implemented using an embedded device having dedicated hardware or a digital signal processing (DSP) chip(s).

Audio data for processing by the single-pass segmentation and classification system 200 may be derived from a compact disk or video disk inserted into the CD-ROM or DVD drive 112 and may be received by the processor 105 as a data stream encoded in a particular format. Audio data may alternatively be derived from downloading audio data from the network 118. Yet another source of audio data may be recording audio using the microphone 115 in which case the audio interface 108 samples an analog signal received from the microphone 115 and provides the audio data to the processor 105 in a particular format for processing and/or storage on the storage device 109.

The audio data may also be provided to the audio interface 108 for conversion into an analog signal suitable for output to the loudspeakers 116.

The single-pass segmentation and classification system 200 is implemented in the general-purpose computer 100 by a software program executed by the processor 105 of the general-purpose computer 100. It is assumed that the audio stream is appropriately digitised at a sampling rate F. Those skilled in the art would understand the steps required to convert an analog audio stream into the sequence x(n) of sampled audio. In a preferred implementation the audio stream is sampled at a sampling rate F of 16 kHz and the sequence x(n) of sampled audio is stored on the storage device 109.

Figure 3:
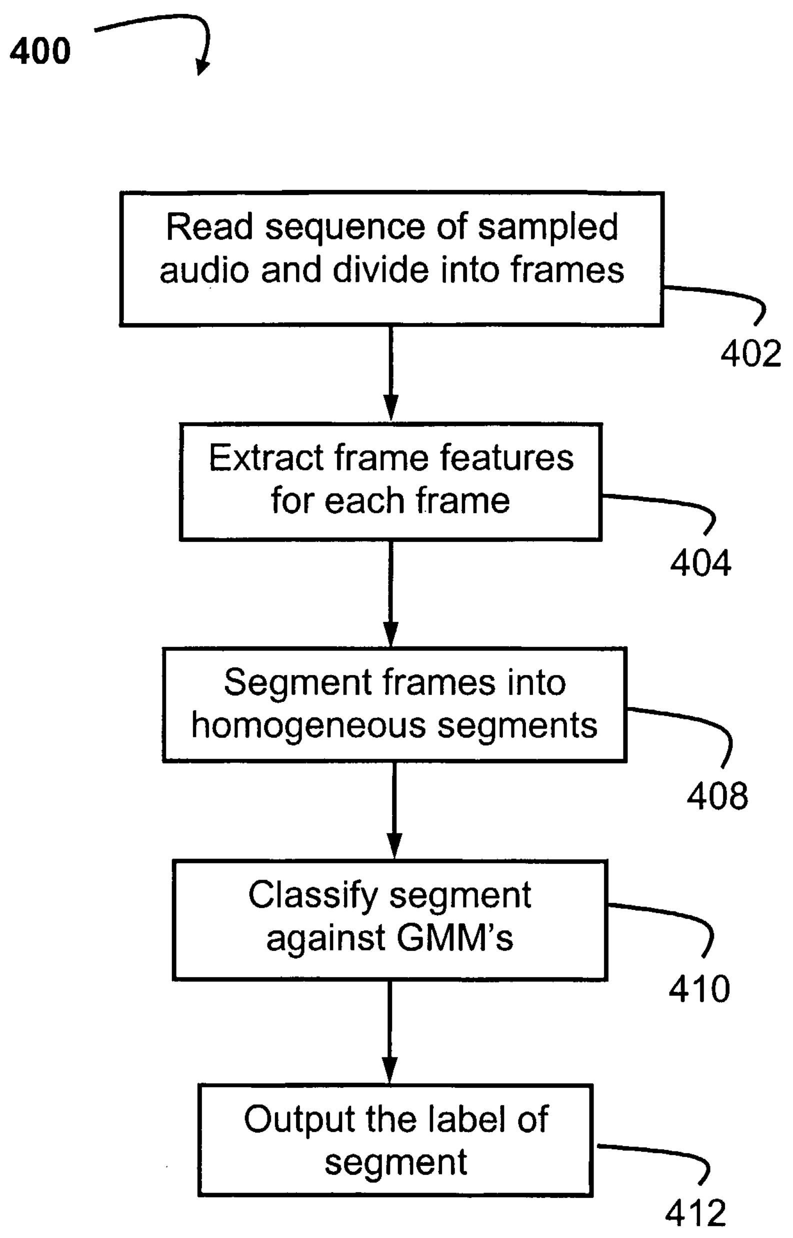
FIG. 3 shows a schematic flow diagram of a process performed by the single-pass segmentation and classification system of FIG. 1.

FIG. 3 shows a schematic flow diagram of a process 400 performed by the single-pass segmentation and classification system 200, and reference is made jointly to FIGS. 1 and 3 during the description of the single-pass segmentation and classification system 200.

Process 400 starts in step 402 where the sequence x(n) of sampled audio is read from the storage device 109 by a streamer 210 and divided into frames. Each frame contains K audio samples x(n). K is preferably a power of 2, allowing the most efficient Fast Fourier Transform (FFT) to be used on the frame in later processing. In the preferred implementation each frame is 16 ms long, which means that each frame contains 256 audio samples x(n) at the sampling rate F of 16 kHz. Further, the frames are overlapping, with the start position of the next frame positioned 8 ms, or 128 samples, later. The streamer 210 is configured to produce one audio frame at a time to a feature calculator 220, or to indicate that not enough audio data is available to complete a next frame.

The feature calculator 220 receives and processes one frame at a time to extract frame features in step 404 for each frame, that is from the K audio samples x(n) of the frame being processed by the feature calculator 220. Once the feature calculator 220 has extracted the frame features, the audio samples x(n) of that frame is no longer required, and may be discarded. The frame features are used in the steps that follow to segment the audio sequence and to classify the segments.

Figure 4:
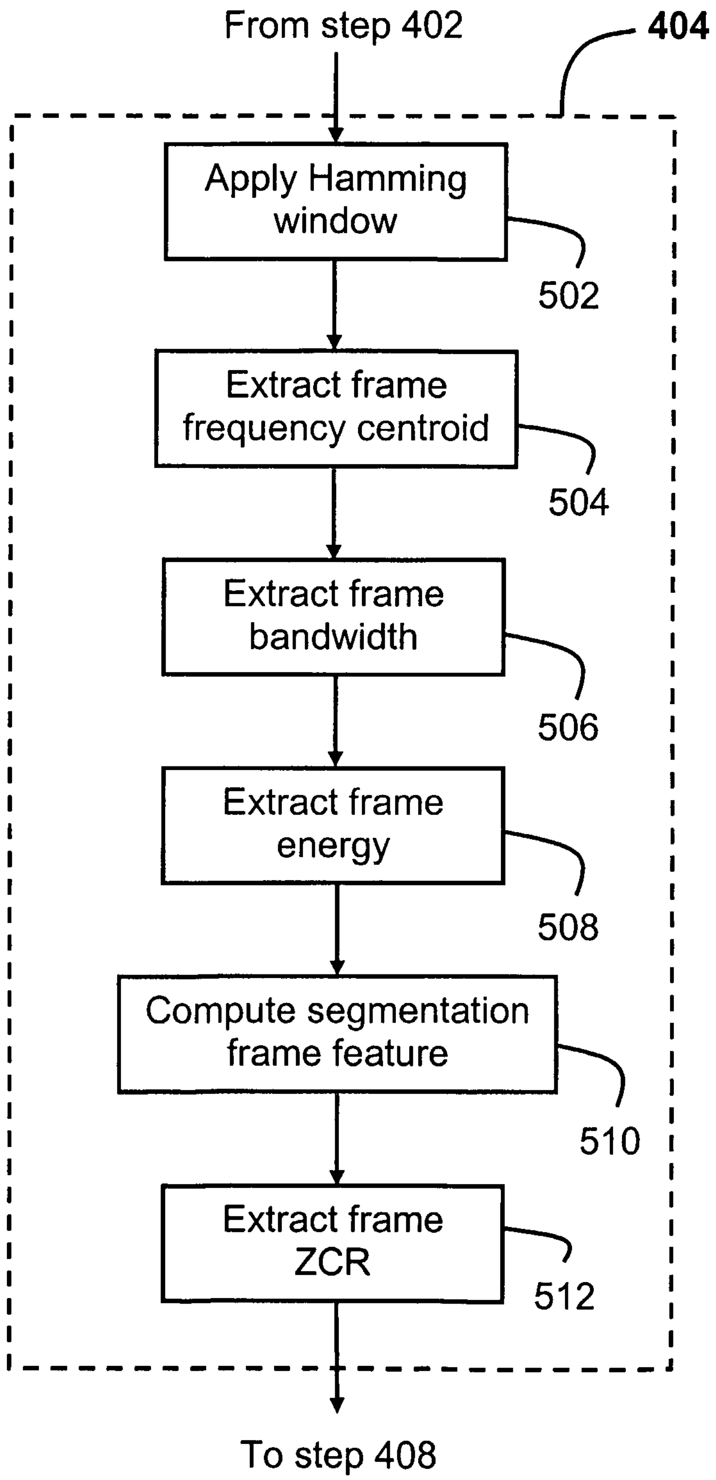
FIG. 4 shows a schematic flow diagram of the sub-steps of a step for extracting frame features performed in the process of FIG. 3.

FIG. 4 shows a schematic flow diagram of step 404 in more detail. Step 404 starts in sub-step 502 where the feature calculator 220 applies a Hamming window function to the sequence samples x(n) in the frame i being processed, with the length of the Hamming window function being the same as that of the frame, i.e. K samples long, to give a modified set of windowed audio samples s(i,k) for frame i, with $k \in 1, \ldots, K$. The purpose of applying the Hamming window is to reduce the side-lobes created when applying the Fast Fourier Transform (FFT) in subsequent operations.

In sub-step 504 the feature calculator 220 extracts the frequency centroid fc of the modified set of windowed audio samples s(i,k) of the i'th frame, with the frequency centroid fc being defined as:

$$fc(i) = \frac{\int_0^\infty \omega |S_i(\omega)|^2 d\omega}{\int_0^\infty |S_i(\omega)|^2 d\omega} \tag{1}$$

where ω is a signal frequency variable for the purposes of calculation and $|S_i(\omega)|^2$ is the power spectrum of the modified windowed audio samples s(i,k) of the i'th frame. The Simpson's Rule of integration is used to evaluate the integrals. The Fast Fourier Transform is used to calculate the power spectrum $|S_i(\omega)|^2$ whereby the samples s(i,k), having length K, are zero padded until the next highest power of 2 is reached. In the preferred implementation where the length K of the samples s(i,k) is 256, no padding is needed.

Next in sub-step 506 the feature calculator 220 extracts the bandwidth bw(i) of the modified set of windowed audio samples s(i,k) of the i'th frame as follows:

$$bw(i) = \sqrt{\frac{\int_0^\infty (\omega - FC(i))^2 |S_i(\omega)|^2 d\omega}{\int_0^\infty |S_i(\omega)|^2 d\omega}} \tag{2}$$

In sub-step 508 the feature calculator 220 extracts the energy E(i) of the modified set of windowed audio samples s(i,k) of the i'th frame as follows:

$$E(i) = \sqrt{\frac{1}{K} \sum_{k=1}^{K} s^2(i, k)} \tag{3}$$

A segmentation frame feature $f_s(i)$ for the i-th frame is calculated by the feature calculator 220 in sub-step 510 by multiplying the weighted sum of frame bandwidth bw(i) and frequency centroid fc(i) by the frame energy E(i). This forces a bias in the measurement of bandwidth bw(i) and frequency centroid fc(i) in those frames that exhibit a higher energy E(i), and are thus more likely to come from an event of interest, rather than just background noise. The segmentation frame feature $f_s(i)$ is thus calculated as:

$$f_s(i) = E(i)((1-\alpha) \times bw(i) + \alpha \times fc(i)) \tag{4}$$

where α is a configurable parameter, preferably 0.4.

Step 404 ends in sub-step 512 where the feature calculator 220 extracts the zero crossing rate (ZCR) of the windowed audio samples s(i,k) within frame i. The ZCR within a frame i represents the rate at which the windowed audio samples s(i,k) cross the expected value of the windowed audio samples s(i,k). When the windowed audio samples s(i,k) have a mean of zero, then the ZCR represents the rate at which the signal samples cross the zero signal line. Thus for the ith frame the ZCR(i) is calculated as:

$$ZCR(i) = \sum_{k=1}^{K} |\text{sign}(s(i, k) - \mu_s) - \text{sign}(s(i, k-1) - \mu_s)|, \tag{5}$$

wherein $\mu_s$ is the mean of the K windowed audio samples s(i,k) within frame i.

Referring again to FIGS. 1 and 3, the frame features extracted by the feature calculator 220, which comprise the frame energy E(i), frame bandwidth bw(i), frequency centroid fc(i), segmentation frame feature f(i) and zero crossing rate ZCR(i), are received by a segmenter 230 which segments the frames into homogeneous segments in step 408. In particular, the segmenter 230 utilises the Bayesian Information Criterion (BIC) applied to the segmentation frame features $f_s(i)$ for segmenting the frames into a number of homogeneous segments. Most previous BIC systems have used multi-dimensional features, such as mel-cepstral vectors or linear predictive coefficients, which are computational expensive due to costly computations involving full-covariance matrices and mean-vectors. The segmentation frame feature $f_s(i)$ used by the segmenter 230 is a one-dimensional feature.

The BIC provides a value which is a statistical measure for how well a chosen model represents a set of segmentation frame features $f_s(i)$, and is calculated as:

$$BIC = \log(L) - \frac{D}{2}\log(N) \tag{6}$$

where L is the maximum-likelihood probability for the chosen model to represent the set of segmentation frame features $f_s(i)$, D is the dimension of the model which is 1 when the segmentation frame features $f_s(i)$ of Equation (4) are used, and N is the number of segmentation frame features $f_s(i)$ being tested against the model.

The maximum-likelihood L is calculated by finding parameters θ of the model that maximise the probability of the segmentation frame features $f_s(i)$ being from that model. Thus, for a set of parameters θ, the maximum-likelihood L is:

$$L = \max_{\theta} P(f_s(i) \mid \theta) \tag{7}$$

Segmentation using the BIC operates by testing whether the sequence of segmentation frame features $f_s(i)$ is better described by a single-distribution event model, or a twin-distribution event model, where the first m number of frames, those being frames [1, . . . , m], are from a first source and the remainder of the N frames, those being frames [m+1, . . . , N], are from a second source. The frame m is termed the change-point. To allow a comparison, a criterion difference ΔBIC is calculated between the BIC using the twin-distribution event model and that using the single-distribution event-model. As the change-point m approaches a transition in acoustic characteristics, the criterion difference ΔBIC typically increases, reaching a maximum at the transition, and reducing again towards the end of the N frames under consideration. If the maximum criterion difference ΔBIC is above a predefined threshold, then the two-distribution event model is deemed a more suitable choice, indicating a significant transition in acoustic characteristics at the transition-point m where the criterion difference ΔBIC reached a maximum.

A range of different statistical event models can be used with the BIC method. The most commonly used event model is a Gaussian event model. Most BIC segmentation systems assume that D-dimensional segmentation frame features $f_s(i)$ are best represented by a Gaussian event model having a probability density function of the form:

$$g(f_s(i), \mu, \Sigma) = \frac{1}{(2\pi)^{\frac{D}{2}}|\Sigma|^{\frac{1}{2}}}\exp\left\{-\frac{1}{2}(f_s(i)-\mu)^T\Sigma^{-1}(f_s(i)-\mu)\right\} \tag{8}$$

where μ is the mean vector of the segmentation frame features $f_s(i)$, and Σ is the covariance matrix. The segmentation frame feature $f_s(i)$ of the preferred implementation is one-dimensional and as calculated in Equation (4).

The maximum log likelihood of N segmentation features $f_s(i)$ fitting the probability density function shown in Equation (8) is:

$$\log(L) = -\frac{N}{2}\log(2\sigma^2) - \frac{1}{2\sigma^2}\sum_{i=1}^{N}(f_s(i)-\mu)^2 \tag{9}$$

Figure 5A:
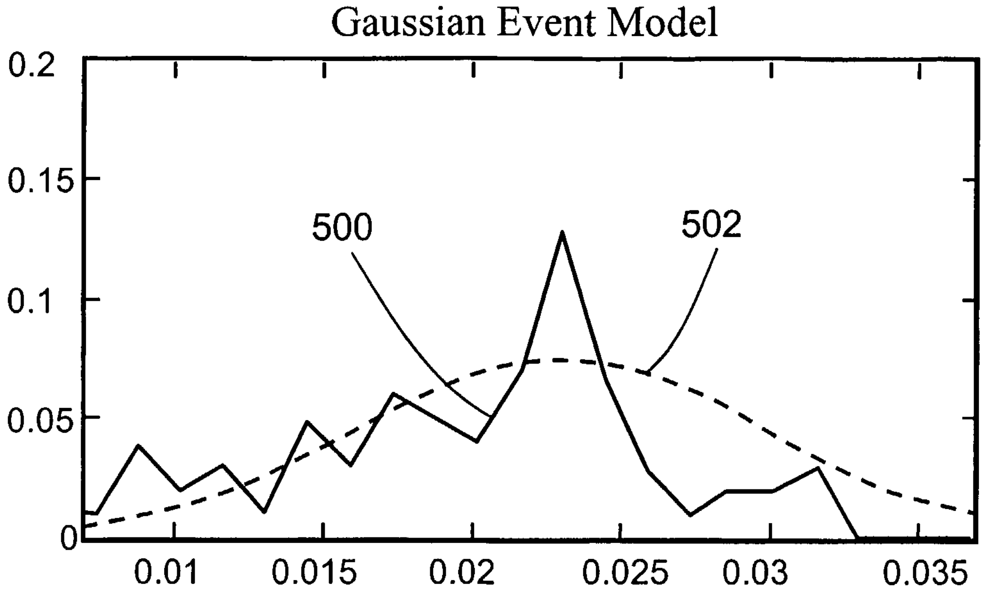
FIG. 5A illustrates a distribution of example frame features and the distribution of a Gaussian event model that best fits the set of frame features obtained from a segment of speech.

FIG. 5A illustrates a distribution 500 of segmentation frame features $f_s(i)$, where the segmentation frame features $f_s(i)$ were obtained from an audio stream of duration 1 second containing voice. Also illustrated is the distribution of a Gaussian event model 502 that best fits the set of segmentation frame features $f_s(i)$.

Figure 5B:
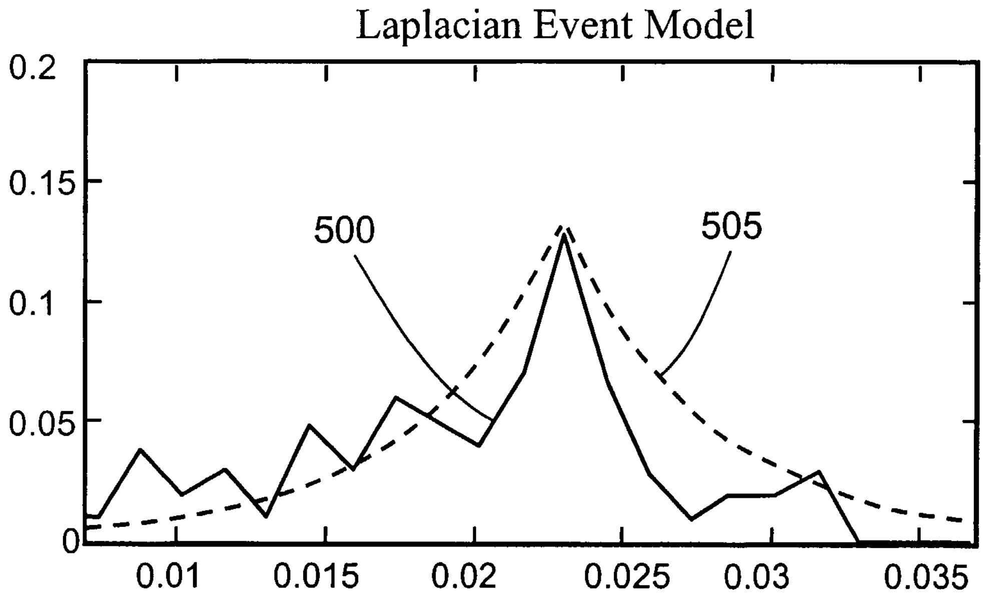
FIG. 5B illustrates a distribution of the example frame features of FIG. 5A and the distribution of a Laplacian event model that best fits the set of frame features.

It is proposed that segmentation frame features $f_s(i)$ representing the characteristics of audio signals such as a particular speaker or block of music, is better represented by a leptokurtic distribution, particularly where the number N of frame features $f_s(i)$ being tested against the model is small. A leptokurtic distribution is a distribution that is more peaked than a Gaussian distribution. An example of a leptokurtic distribution is a Laplacian distribution. FIG. 5B illustrates the distribution 500 of the same segmentation frame features $f_s(i)$ as those of FIG. 5A, together with the distribution of a Laplacian event model 505 that best fits the set of segmentation frame features $f_s(i)$. It can be seen that the Laplacian event model gives a much better characterisation of the feature distribution 500 than the Gaussian event model.

Figure 6A:
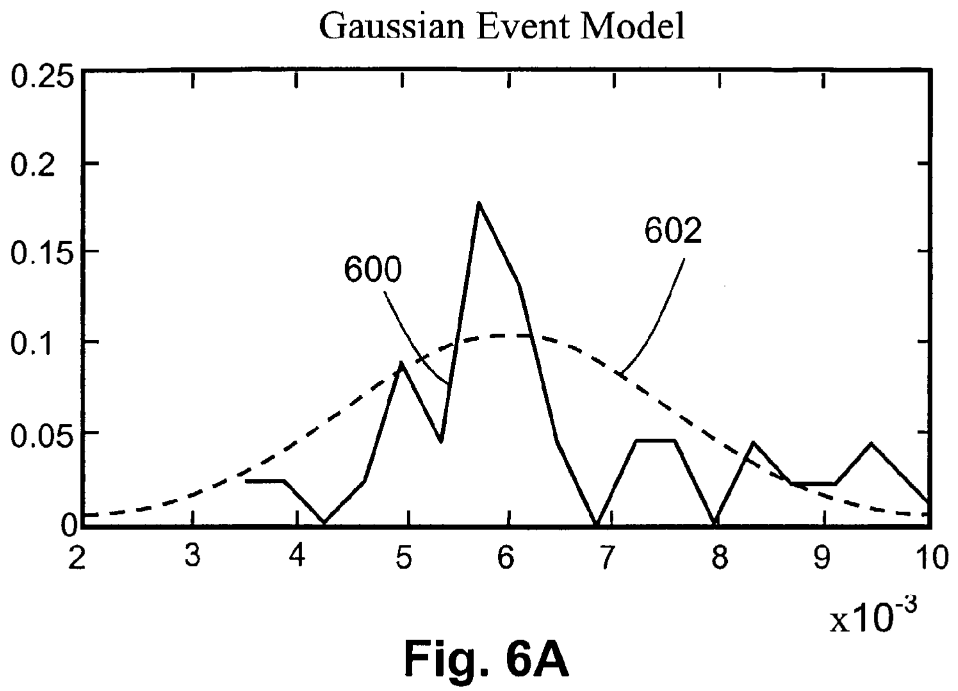
FIG. 6A illustrates a distribution of example frame features and the distribution of a Gaussian event model that best fits the set of frame features obtained from a segment of music.
Figure 6B:
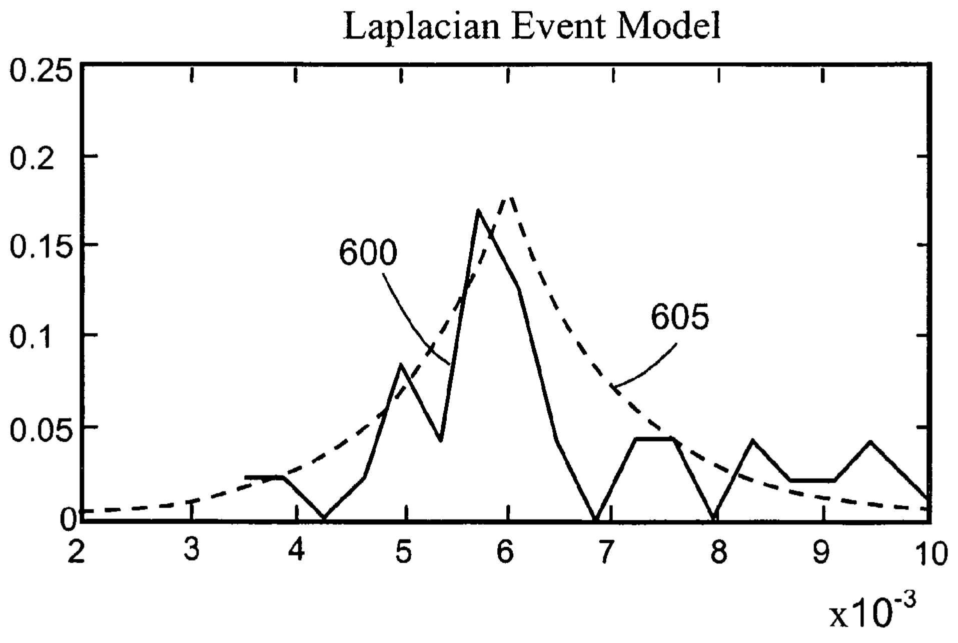
FIG. 6B illustrates a distribution of the example frame features of FIG. 6A and the distribution of a Laplacian event model that best fits the set of frame features.

This proposition is further illustrated in FIGS. 6A and 6B wherein a distribution 600 of segmentation frame features $f_s(i)$ obtained from an audio stream of duration 1 second containing music is shown. The distribution of a Gaussian event model 602 that best fits the set of segmentation frame features $f_s(i)$ is shown in FIG. 6A, and the distribution of a Laplacian event model 605 is illustrated in FIG. 6B.

A quantitative measure to substantiate that the Laplacian distribution provides a better description of the distribution characteristics of the segmentation frame features $f_s(i)$ for short events rather than the Gaussian model is the Kurtosis statistical measure κ, which provides a measure of the "peakiness" of a distribution and may be calculated for a sample set X as:

$$\kappa = \frac{E(X - E(X))^4}{(\mathrm{var}(X))^2} - 3 \tag{10}$$

For a true Gaussian distribution, the Kurtosis measure κ is 0, whilst for a true Laplacian distribution the Kurtosis measure κ is 3. In the case of the distributions 500 and 600 shown in FIGS. 5A and 6A, the Kurtosis measures κ are 2.33 and 2.29 respectively. Hence the distributions 500 and 600 are more Laplacian in nature than Gaussian.

The Laplacian probability density function in one dimension is:

$$g(f_s(i), \mu, \sigma) = \frac{1}{\sqrt{2}\,\sigma}\exp\left\{-\frac{\sqrt{2}\,|f_s(i)-\mu|}{\sigma}\right\} \tag{11}$$

where μ is the mean of the segmentation frame features $f_s(i)$ and σ is their standard deviation. In a higher order feature space with segmentation frame features $f_s(i)$, each having dimension D, the feature distribution is represented as:

$$g(f_s(i), \mu, \Sigma) = \frac{2}{(2\pi)^{\frac{D}{2}}|\Sigma|^{\frac{1}{2}}}\left\{\frac{(f_s(i)-\mu)^T\Sigma^{-1}(f_s(i)-\mu)}{2}\right\}^{\frac{v}{2}} K_v\left(\sqrt{2(f_s(i)-\mu)^T\Sigma^{-1}(f_s(i)-\mu)}\right) \tag{12}$$

where v=(2−D)/2 and $K_v(.)$ is the modified Bessel function of the third kind.

Whilst the segmentation performed in step 408 may be performed using multi-dimensional segmentation features $f_s(i)$, as noted above, the preferred implementation uses the one-dimensional segmentation frame feature $f_s(i)$ shown in Equation (4). Accordingly, given N segmentation frame features $f_s(i)$, the maximum likelihood L for the set of segmentation frame features f(i) falling under a single Laplacian distribution is:

$$L = \prod_{i=1}^{N}\left((2\sigma^2)^{-\frac{1}{2}}\exp\left(-\frac{\sqrt{2}}{\sigma}|f_s(i)-\mu|\right)\right) \tag{13}$$

where σ is the standard deviation of the segmentation frame features $f_s(i)$ and μ is the mean of the segmentation frame features $f_s(i)$. Equation (13) may be simplified in order to provide:

$$L = (2\sigma^2)^{-\frac{N}{2}}\exp\left(-\frac{\sqrt{2}}{\sigma}\sum_{i=1}^{N}|f_s(i)-\mu|\right) \tag{14}$$

The maximum log-likelihood log(L), assuming natural logs, for all N frame features f(i) to fall under a single Laplacian event model is thus:

$$\log(L) = -\frac{N}{2}(2\sigma^2) - \frac{\sqrt{2}}{\sigma}\sum_{i=1}^{N}|f_s(i)-\mu| \tag{15}$$

A log-likelihood ratio R(m) provides a measure of the frames belonging to a twin-Laplacian distribution event model rather than a single Laplacian distribution event model, with the division in the twin-Laplacian distribution event model being at frame m, is:

$$R(m)=\log(L_1)+\log(L_2)-\log(L) \tag{16}$$

where:

$$\log(L_1) = -\frac{m}{2}(2\sigma_1^2) - \frac{\sqrt{2}}{\sigma_1}\sum_{i=1}^{m}|f_s(i)-\mu_1| \tag{17}$$

and $$\log(L_2) = -\frac{(N-m)}{2}(2\sigma_2^2) - \frac{\sqrt{2}}{\sigma_2}\sum_{i=m+1}^{N}|f_s(i)-\mu_2| \tag{18}$$

wherein $\{\mu_1, \sigma_1\}$ and $\{\mu_2, \sigma_2\}$ are the means and standard-deviations of the segmentation frame features $f_s(i)$ before and after the change point m.

The criterion difference ΔBIC for the Laplacian case having a change point m is calculated as:

$$\Delta BIC(m) = R(m) - \frac{1}{2}\log\left(\frac{m(N-m)}{N}\right) \tag{19}$$

In the preferred implementation of the BIC, a segmentation window is filled with a sequence of N segmentation frame features $f_s(i)$. It is then determined by the segmenter 230 whether the centre of the segmentation window defines a transition. In the case where the centre does not define a transition, the segmentation window is advanced by a predetermined number of frames before the centre is again tested.

Figure 7:
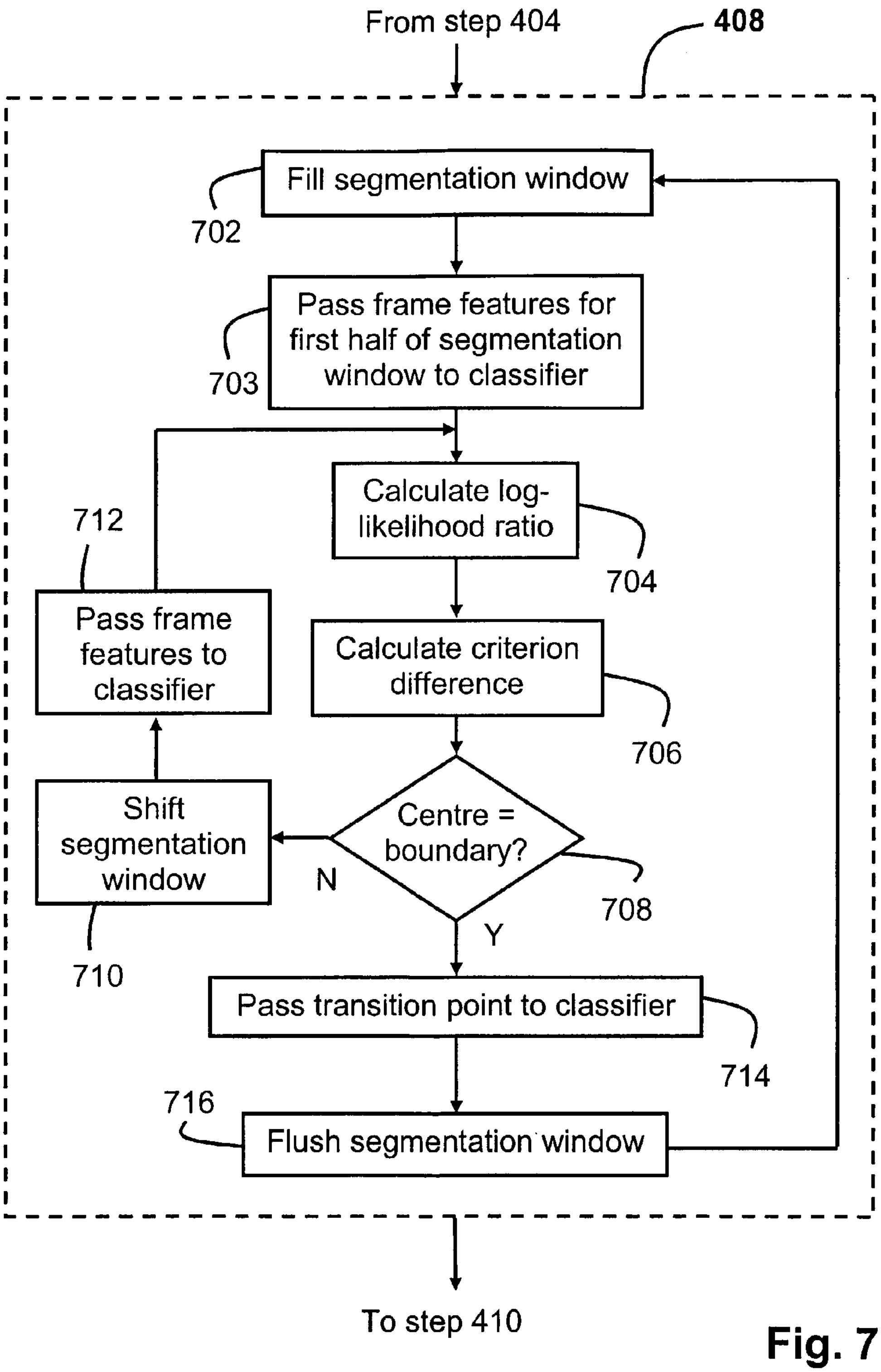
FIG. 7 shows a schematic flow diagram of the sub-steps of a step for segmenting frames into homogeneous segments performed in the process of FIG. 3.

FIG. 7 shows a schematic flow diagram of the sub-steps of step 408 (FIG. 3). Step 408 starts in sub-step 702 where the segmenter 230 buffers segmentation frame features $f_s(i)$ until the segmentation window is filled with N segmentation frame features $f_s(i)$. Preferably the segmentation window is N=80 frames long.

Since it is assumed that the frames in the first half of the segmentation window do belong to the current segment being formed, the frame features of the frames in the first half of the segmentation window are passed to a classifier 240 in sub-step 703 for further processing. The segmenter 230 then, in sub-step 704, calculates the log-likelihood ratio R(m) by first calculating the means and standard deviations $\{\mu_1, \sigma_1\}$ and $\{\mu_2, \sigma_2\}$ of the segmentation frame features $f_s(i)$ in the first and second halves of the segmentation window respectively. Sub-step 706 follows where the segmenter 230 calculates the criterion difference ΔBIC(m) using Equation (19).

Then, in sub-step 708, the segmenter 230 determines whether the centre of the segmentation window is a transition between two homogeneous segments by determining whether the criterion difference ΔBIC(m) is greater than a predetermined threshold, which is set to 0 in the preferred implementation.

If it is determined in sub-step 708 that the centre of the segmentation window is not a transition between two homogeneous segments, then the segmenter 230 in sub-step 710 shifts the segmentation window forward in time by removing a predetermined number of the oldest segmentation frame features $f_s(i)$ from the segmentation window and adding the same number of new segmentation frame features $f_s(i)$ thereto. In the preferred implementation the predetermined number of frames is 10.

As soon as a segmentation frame feature $f_s(i)$ passes the centre of the segmentation window, it is known that the frame i represented by the segmentation frame feature $f_s(i)$ is part of a current segment being formed. Accordingly, the frame features of the frames that shifted past the centre of the segmentation window are passed to a classifier 240 in sub-step 712 for further processing before step 408 returns to sub-step 704 from where the segmenter 230 again determines whether the centre of the shifted segmentation window defines a transition.

The segmentation window may be easily implemented using a data structure known as a circular buffer, allowing frame feature data to be shifted as more data becomes available, and allowing old data to be removed once the data moved through the circular buffer.

Sub-steps 704 to 712 continue until the segmenter 230 finds a transition. Step 408 then continues to sub-step 714 where the frame number i of the frame where the transition occurred is also passed to the classifier 240. The frame number i of the frame where the transition point occurred may optionally also be reported to a user interface for display on the video display 114 (FIG. 2).

In sub-step 716 all the segmentation frame features $f_s(i)$ that have been determined to belong to the current segment are flushed from the segmentation window. The operation of the segmenter 230 then returns to sub-step 702 where the segmenter 230 again buffers segmentation frame features $f_s(i)$ until the segmentation window is filled with N segmentation frame features $f_s(i)$ before the segmenter 230 starts to search for the next transition between segments.

Referring again to FIGS. 1 and 3, as is described above with reference to the segmentation step 408, the classifier 240 receives from the segmenter 230 the frame features, calculated using Equations (1) to (5), of all the frames belonging to the current segment, even while a transition has not as yet been found. When the transition is located the classifier 240 receives the frame number of the transition, or last frame in the current segment. This allows the classifier 240 to build up statistics of the current segment in order to make a classification decision as soon as the classifier 240 receives notification that a transition has been found, in other words, that the boundary of the current segment has been found. The classification decision is delayed by only half of the segmentation window length, which is 40 frames in the preferred implementation. Since the classifier 240 does not add any delay to the system 200, and a delay of 40 frames is a relatively small delay, system 200 is extremely responsive.

In order to classify the homogeneous segment, the classifier 240 extracts a number of statistical features from the segment. However, whilst previous systems extract a feature vector from the segment and then classify the segment based on the feature vector, the classifier 240 divides each homogenous segment into a number of smaller sub-segments, or clips, with each clip large enough to extract a meaningful clip feature vector f from the clip. The clip feature vectors f are then used to classify the associated segment based on the characteristics of the distribution of the clip feature vectors f. The key advantage of extracting a number of clip feature vectors f from a series of smaller clips rather than a single feature vector for a whole segment is that the characteristics of the distribution of the feature vectors f over the segment of interest may be examined. Thus, whilst the signal characteristics over the length of the segment are expected to be reasonably consistent, some important characteristics in the distribution of the clip feature vectors f over the segment of interest is significant for classification purpose.

Each clip comprises B frames. In the preferred implementation where each frame is 16 ms long and overlapping with a shift-time of 8 ms, each clip is defined to be at least 0.64 seconds long. The clip thus comprises at least 79 frames.

The classifier 240 then extracts a clip feature vector f for each clip from the frame features received from the segmenter 230, and in particular the frame energy E(i), frame bandwidth bw(i), frequency centroid fc(i), and zero crossing rate ZCR(i) of each frame within the clip. In the preferred implementation, the clip feature vector f for each clip consists of six different clip features, which are:

(i) volume standard deviation;

(ii) volume dynamic range;

(iii) zero-crossing rate standard deviation;

(iv) bandwidth;

(v) frequency centroid; and (vi) frequency centroid standard deviation.

The volume standard deviation (VSTD) is a measure of the variation characteristics of the root means square (RMS) energy contour of the frames within the clip. The VSTD is calculated over the B frames of the clip as:

$$VSTD = \sqrt{\frac{\sum_{i=1}^{B} (E(i) - \mu_E)^2}{B}}, \tag{20}$$

wherein E(i) is the energy of the modified set of windowed audio samples s(i,k) of the i'th frame calculated in sub-step 508 (FIG. 4) using Equation (3) and $\mu_E$ is the mean of the B frame energies E(i).

The volume dynamic range (VDR) is similar to the VSTD. However the VDR measures the range of deviation of the energy values E(i) only, and as such is calculated as:

$$VDR = \frac{\max_i (E(i)) - \min_i (E(i))}{\max_i (E(i))}, \quad \text{where } i \in [1, 2, \ldots, B] \tag{21}$$

The zero-crossing rate standard deviation (ZSTD) clip feature examines the standard deviation of the zero-crossing rate (ZCR) over all frames in the clip of interest. The ZSTD clip feature is then calculated over B frames as:

$$ZSTD = \sqrt{\frac{\sum_{i=1}^{B} (ZCR(i) - \mu_{ZCR})^2}{B-1}} \tag{22}$$

wherein $\mu_{ZCR}$ is the mean of the ZCR values calculated using Equation (5).

The dominant frequency range of the signal is estimated by the signal bandwidth. In order to calculate a long-term estimate of bandwidth BW over a clip, the frame bandwidths bw(i) (calculated using Equation (2)) are weighted by their respective frame energies E(i) (calculated using Equation (3)), and summed over the entire clip. Thus the clip bandwidth BW is calculated as:

$$BW = \frac{1}{\sum_{i=1}^{B} E(i)} \sum_{i=1}^{B} E(i)bw(i) \tag{23}$$

The fundamental frequency of the signal is estimated by the signal frequency centroid. In order to calculate a long-term estimate of frequency centroid (FC) over a clip, the frame frequency centroids fc(i) (calculated using Equation (1)) are weighted by their respective frame energies E(i) (calculated using Equation (3)), and summed over the entire clip. Thus the clip frequency centroid FC is calculated as:

$$FC = \frac{1}{\sum_{i=1}^{B} E(i)} \sum_{i=1}^{B} E(i)fc(i) \tag{24}$$

The frequency centroid standard deviation (FCSTD) attempts to measure the characteristics of the frequency centroid variation over the clip of interest. Frequency centroid is an approximate measure of the fundamental frequency of a section of signal; hence a section of music or voiced speech will tend to have a smoother frequency centroid contour than a section of silence or background noise.

With the clip features calculated, the clip feature vector f is formed by assigning each of the six clip features as an element of the clip feature vector f as follows:

$$f = \begin{bmatrix} VSTD \\ VDR \\ ZSTD \\ BW \\ FC \\ FCSTD \end{bmatrix} \tag{25}$$

Figure 8:
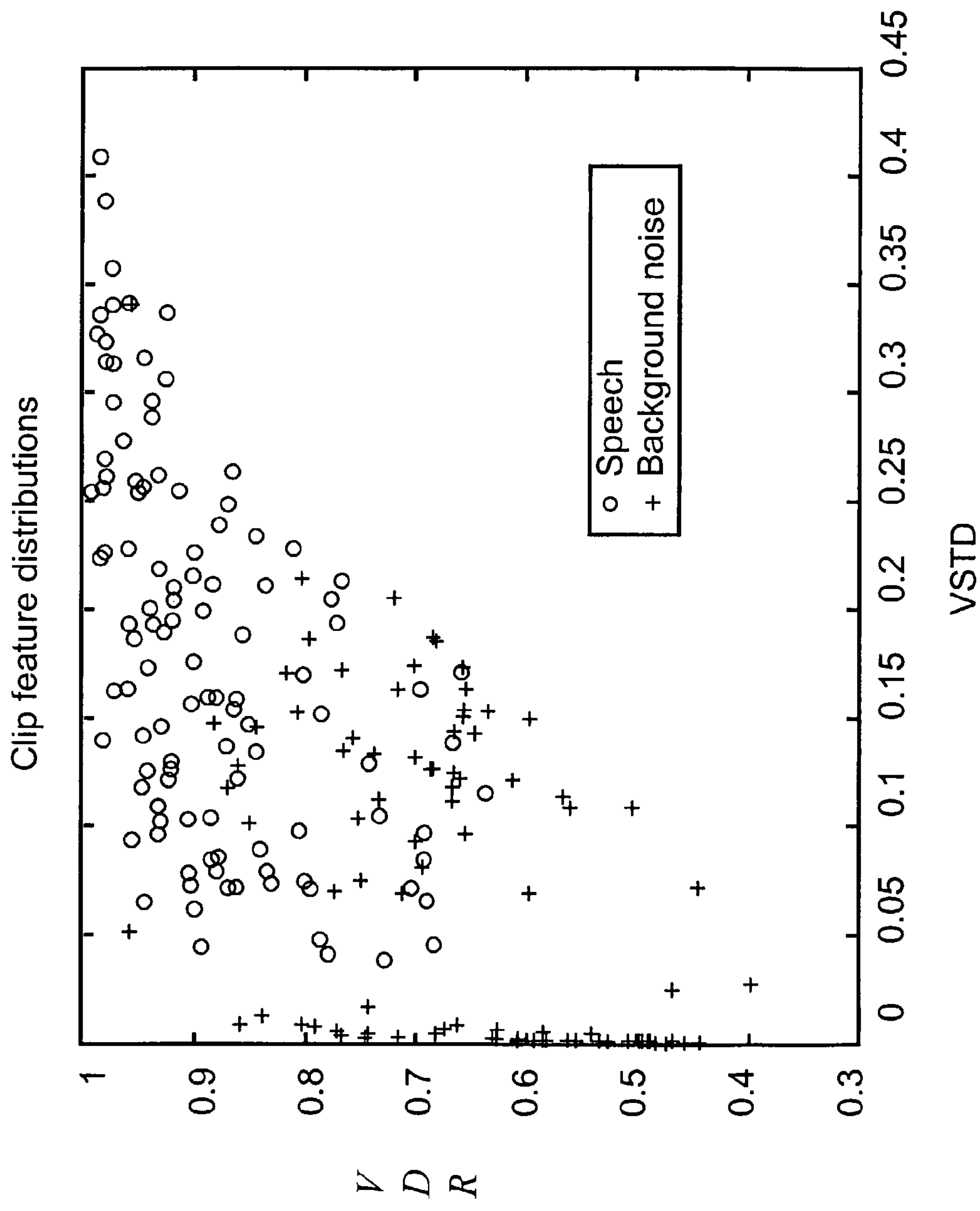
FIG. 8 shows a plot of the distribution of a clip feature vector comprising two clip features.

To illustrate the nature of the distribution of the clip features over a homogenous segment, FIG. 8 shows a plot of the distribution of two particular clip features, namely the volume dynamic range (VDR) and volume standard deviation (VSTD), over a set of segments containing speech, and a set of segments containing background noise. The distributions of clip feature vectors, as shown in this example, are clearly multi-modal in nature.

With the clip feature vectors f extracted, the classifier 240 operates to solve what is known in pattern recognition literature as an open-set identification problem. The open-set identification may be considered as a combination between a standard closed-set identification scenario and a verification scenario. In a standard closed-set identification scenario, a set of test features from unknown origin are classified against features from a finite set of classes, with the most probable class being allocated as the identity label for the object associated with the set of test features. In a verification scenario, again a set of test features from an unknown origin is presented. However, after determining the most probable class, it is then determined whether the test features match the features of the class closely enough in order to verify its identity. If the match is not close enough, the identity is labelled as "unknown". Hence, the classifier 240 classifies the current segment in step 410 (FIG. 3) as either belonging to one of a number of pre-trained models, or as unknown.

The open-set identification problem is well suited to classification in an audio stream, as it is not possible to adequately model every type of event that may occur in an audio sample of unknown origin. It is therefore far better to label an event, which is dissimilar to any of the trained models, as "unknown", rather than falsely labelling that event as another class.

Figure 9:
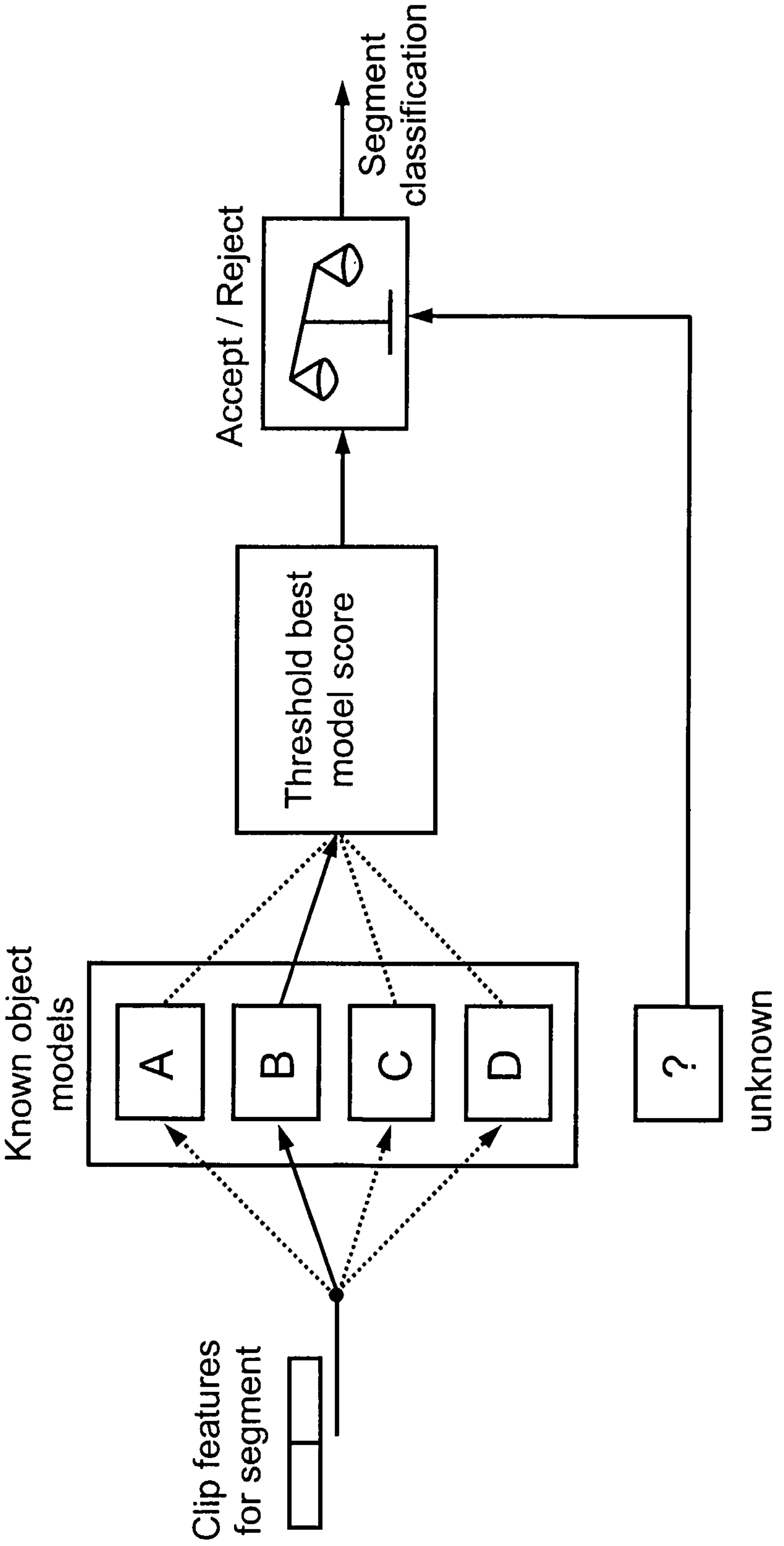
FIG. 9 illustrates the classification of the segment against 4 known classes A, B. C and D.

FIG. 9 illustrates the classification of the segment, characterised by its extracted clip feature vectors f, against 4 known classes A, B, C and D, with each class being defined by an object model. The extracted clip feature vectors f are "matched" against the object models by determining a model score between the clip feature vectors f of the segment and each of the object models. An empirically determined threshold is applied to the best model score. If the best model score is above the threshold, then the label of the class A, B, C or D to which the segment was more closely matched is assigned as the object label. However, if the best model score is below the threshold, then the segment does not match any of the object models closely enough, and the segment is assigned the label "unknown".

Given that the distribution of clip features is multi-modal, a simple distance measure, such as Euclidean or Mahalanobis, will not suffice for calculating a score for the classification. The classifier 240 is therefore based on a continuous distribution function defining the distribution of the clip feature vectors f.

In the preferred implementation a mixture of Gaussians, or Gaussian Mixture Model (GMM) is used as the continuous distribution function. A Gaussian mixture density is defined as a weighted sum of M component densities, expressed as:

$$p(x \mid \lambda) = \sum_{i=1}^{M} p_i b_i(x) \tag{26}$$

where x is a D dimensional random sample vector, $b_i(x)$ are the component density functions, and $p_i$ are the mixture weights.

Each density function $b_i$ is a D dimensional Gaussian function of the form:

$$b_i(x) = \frac{1}{(2\pi)^{\frac{D}{2}} |\Sigma_i|^{\frac{1}{2}}} \exp\left\{-\frac{1}{2}(x-\mu_i)^T \Sigma_i^{-1} (x-\mu_i)\right\}. \tag{27}$$

where $\Sigma_i$ is the covariance matrix and $\mu_i$ the mean vector for the density function $b_i$.

The Gaussian mixture model $\lambda_c$, with c=1, 2, . . . , C where C is the number of class models, is then defined by the covariance matrix $\Sigma_i$ and mean vector $\mu_i$ for each density function $b_i$, and the mixture weights $p_i$, collectively expressed as:

$$\lambda_c = \{p_i, \mu_i, \Sigma_i; i=1, \ldots, M\} \tag{28}$$

Figure 10:
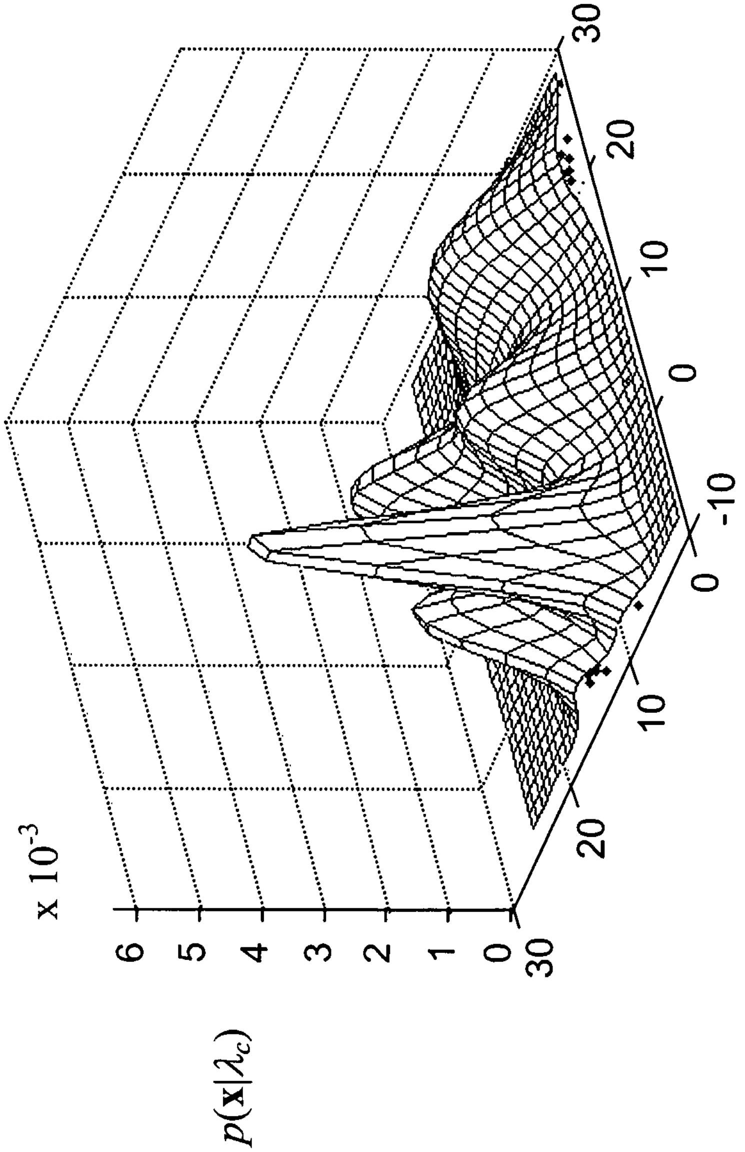
FIG. 10 shows an example five-mixture Gaussian mixture model for a sample of two-dimensional speech features.

The characteristics of the probability distribution function $p(x|\lambda_c)$ of the GMM can be more clearly visualized when using two-dimensional sample data x. FIG. 10 shows an example five-mixture GMM for a sample of two-dimensional speech features $x_1$ and $x_2$, where $x=[x_1, x_2]$.

The GMM $\lambda_c$ is formed from a set of labelled training data via the expectation-maximization (EM) algorithm known in the art. The labelled training data is clip feature vectors f extracted from clips with known origin. The EM algorithm is an iterative algorithm that, after each pass, updates the estimates of the mean vector $\mu_i$, covariance matrix $\Sigma_i$ and mixture weights $p_i$. Around 20 iterations are usually satisfactory for convergence.

In a preferred implementation GMM's with 6 mixtures and diagonal covariance matrices $\Sigma_i$ are used. The preference for diagonal covariance matrices $\Sigma_i$ over full covariance matrices is based on the observation that GMM's with diagonal covariance matrices $\Sigma_i$ are more robust to mismatches between training and test data.

With the segment being classified comprising T clips, and hence being characterised by T clip feature vectors $f_t$, the model score between the clip feature vectors $f_t$ of the segment and one of the C object models is calculated by summing the log statistical likelihoods of each of T feature vectors $f_t$ as follows:

$$\hat{s}_c = \sum_{t=1}^{T} \log p(f_t \mid \lambda_c) \tag{29}$$

where the model likelihoods $p(f_t|\lambda_c)$ are determined by evaluating Equation (26). The log of the model likelihoods $p(f_t|\lambda_c)$ is taken to ensure no computational underflows occur due to very small likelihood values.

Equation (29) may be evaluated by storing the clip feature vectors $f_t$ of all the clips of the current segment in a memory buffer, and calculating the model scores $\hat{s}_c$ only when the end of the segment has been found. The amount of memory required for such a buffer is determined by the length of the segment. For segments of arbitrary length, this memory requirement is unbounded.

To alleviate the above noted problem, an incremental method is implemented in the preferred implementation. It is noted that Equation (29) is just a simple summation of the logs of the model likelihood of each individual clip, independent of other clips. This enables the algorithm to accumulate the frame features of the current segment until enough frame features have been accumulated to form a clip. The clip feature vector $f_t$ for that clip is then extracted, and the newly calculated clip feature vector $f_t$ to update the model scores $\hat{s}_c$ by using the equation:

$$\hat{s}_c = \hat{s}_c + \log p(f_t|\lambda_c) \quad (30)$$

The memory buffer used to store the clip feature vector $f_t$, as well as a certain number of the feature vectors of the frames making up the clip, may then be cleared as that data is no longer required. In the preferred implementation where the clips are overlapping by half the length of the clip, half of the feature vectors of the frames making up the clip may be discarded.

Once the boundary (end) of the current segment is detected, the model scores $\hat{s}_c$ are used by the classifier 240 to classify the current segment. The classification of the current segment, along with the boundaries thereof, may then be reported to the user via the user interface, typically through the video display 114. The classifier 240 then empties its buffers from frame feature and clip feature vector $f_t$ data, and resets the model scores $\hat{s}_c$ to zero before starting with the classification of a next segment.

In an alternative implementation of the single-pass segmentation and classification system 200 the intermediate values of the model scores $\hat{s}_c$ calculated using Equation (30) are used to determine a preliminary classification for the current segment, even before the boundary of the current segment has been found by the segmenter 230. The preliminary classification serves as an indication of what the final classification for the current segment is most likely to be. While the preliminary classification may not be as accurate as the final classification, reporting the preliminary classification has advantages, which are explored later in the description.

As is described in relation to FIG. 9, an adaptive algorithm is employed by the classifier 240 to determine whether the model corresponding to a best model score $\hat{s}_p$ truly represents the segment under consideration, or whether the segment should rather be classified as "unknown". The best model score $\hat{s}_p$ is defined as:

$$\hat{s}_p = \max_c(\hat{s}_c) \quad (31)$$

The adaptive algorithm is based upon a distance measure $D_{i,j}$ between object models of the classes to which the test segment may belong. FIG. 10 illustrates four classes and the inter-class distances $D_{i,j}$ between each object model i and j. As the object models are made up of a mixture of Gaussians, the distance measure $D_{i,j}$ is based on a weighted sum of the Mahalanobis distance between the mixtures of the models i and j as follows:

$$D_{ij} = \sum_{m=1}^{M}\sum_{n=1}^{N} p_m^i p_n^j \Delta_{mn}^{ij} \quad (32)$$

where M and N are the number of mixtures in class models i and j respectively, $p_m^i$ and $p_m^j$ are the mixture weights within each model, and $\Delta_{mn}^{ij}$ is the Mahalanobis distance between mixture m of class i and mixture n of class j. The inter-class distances $D_{i,j}$ may be predetermined from the set of labelled training data, and stored in memory 106.

The Mahalanobis distance between two mixtures is calculated as:

$$\Delta_{mn}^{ij} = (\mu_m^i - \mu_n^j)^T(\Sigma_m^i + \Sigma_n^j)^{-1}(\mu_m^i - \mu_n^j) \quad (33)$$

Because diagonal covariance matrices are used, the two covariance matrices $\Sigma_m^i$ and $\Sigma_n^j$ may simply be added in the manner shown. It is noted that the Mahalanobis distance $\Delta_{mn}^{ij}$ is not strictly speaking a correct measure of distance between two distributions. When the distributions are the same, the distance should be zero. However, this is not the case for the Mahalanobis distance $\Delta_{mn}^{ij}$ defined in Equation (33). For this to be achieved, various constraints have to be placed on Equation (32). This adds a huge amount of computation to the process and is not necessary for the classification, as a relative measure of class distances is all that is needed.

In order to decide whether the segment should be assigned the label of the class with the highest score, or labelled as "unknown", a confidence score is calculated. This is achieved by taking the difference of the top two model scores $\hat{s}_p$ and $\hat{s}_q$, and normalizing that difference by the distance measure $D_{pq}$ between their class models p and q. This is based on the premise that an easily identifiable segment should be a lot closer to the model it belongs to than the next closest model. With further apart models, the model scores $\hat{s}_c$ should also be well separated before the segment is assigned the class label of the class with the highest score. More formally, the confidence score may be defined as:

$$\Phi = 1000\frac{\hat{s}_p - \hat{s}_q}{D_{pq}} \quad (34)$$

The additional constant of 1000 is used to bring the confidence score $\Phi$ into a more sensible range. A threshold $\tau$ is applied to the confidence score $\Phi$. In the preferred implementation a threshold $\tau$ of 5 is used. If the confidence score $\Phi$ is equal or above the threshold $\tau$, then the segment is given the class label of the highest model score $\hat{s}_p$, else the segment is given the label "unknown".

Certain aspects of the single-pass segmentation and classification system 200 ensure operation in real time and fixed memory. "Real time" is defined as an application which requires a program to respond to stimuli within some small upper limit of response time. More loosely the term "real time" is used to describe an application or a system that gives the impression of being responsive to events as the events happen.

One aspect that ensures the operation of system 200 in fixed memory is that audio samples are discarded early in process 400 (FIG. 3). In particular, audio samples are discarded in step 404, which is as soon as the frame features are extracted therefrom. This also eliminates movement of large blocks of data between modules 220, 230 and 240, and aids in making the implementation faster. The segmenter 230 uses a sliding segmentation window for making segmentation decisions, again allowing feature vectors of frames that moved through the segmentation window to be discarded. Classification only requires a running model score $\hat{s}_c$ for each model for the current segment. All modules 210, 220, 230 and 240 keep only a small or minimal buffer of data necessary to calculate features, and keep on recycling these buffers by using well-known techniques such as utilising circular buffers.

System 200 may be said to be operating in real time if a classification decision is produced as soon as the end boundary of a segment is found. By updating the model scores $\hat{s}_c$ continuously, very little processing is necessary when the boundary is found. Also, in the implementation where the preliminary classification is provided, the system 200 produces a classification decision even before the boundary of the segment has been found.

Figure 11:
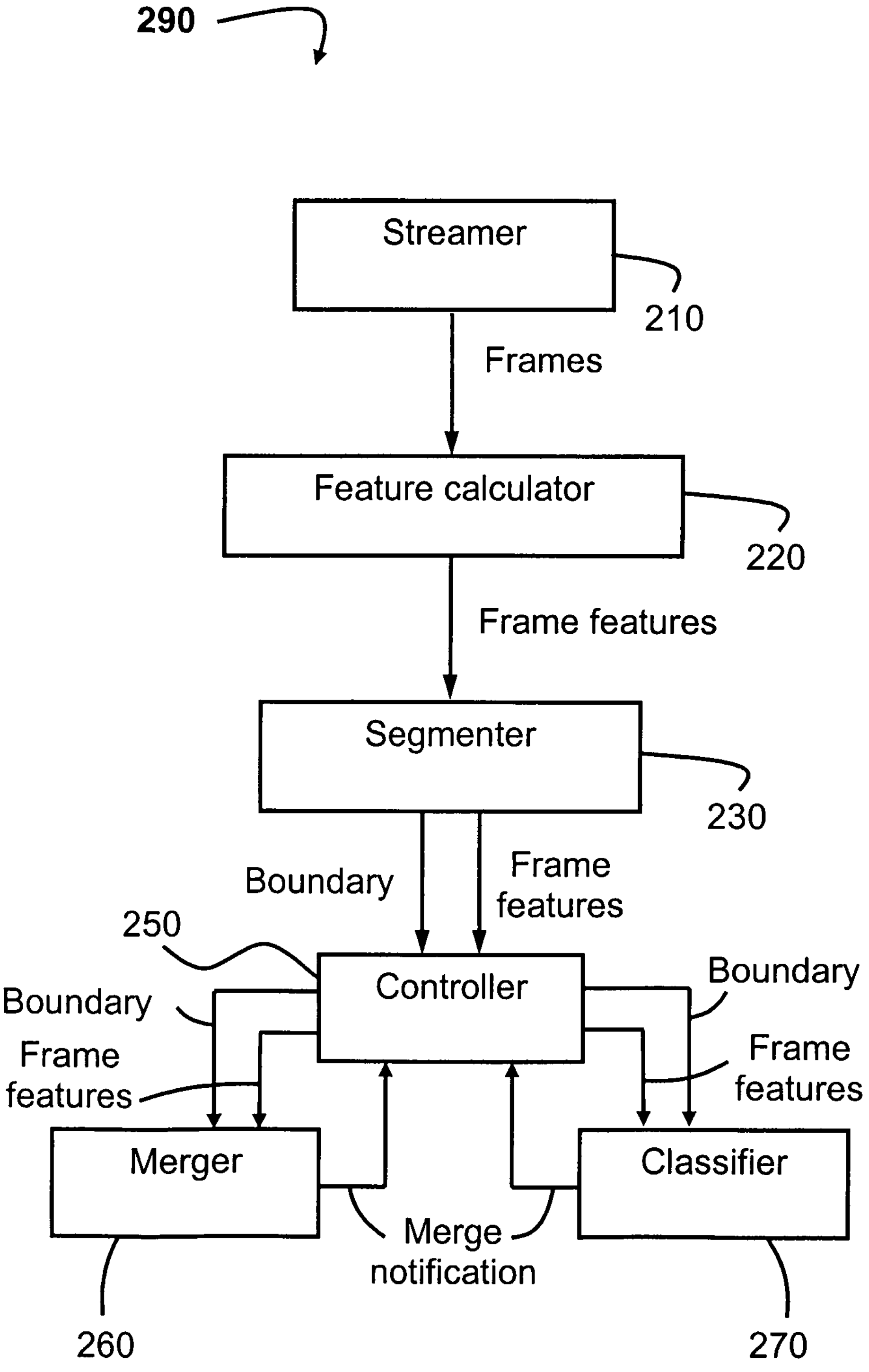
FIG. 11 shows a schematic block diagram of a two-pass segmentation and classification system.

The above describes the single-pass segmentation and classification system 200. FIG. 11 shows a schematic block diagram of a two-pass segmentation and classification system 290 for segmenting an audio stream from unknown origin into homogeneous segments, and then classifying those homogeneous segments. Two-pass segmentation differs from single-pass segmentation in that, after two adjacent homogeneous segments have been determined, the boundary between those adjacent segments is reconsidered, testing whether the two adjacent segments should be merged.

The two-pass segmentation and classification system 290 may also be practiced on the general-purpose computer 100 shown in FIG. 2 by executing a software program in the processor 105 of the general-purpose computer 100.

The two-pass segmentation and classification system 290 is similar to the single-pass segmentation and classification system 200 and also comprises a streamer 210, feature calculator 220, and segmenter 230, each of which operating in the manner described with reference to FIGS. 1 and 3. The two-pass segmentation and classification system 290 further includes a controller 250, a merger 260 and a classifier 270.

In system 290 the controller 250 receives the frame features from the segmenter 230, and then passes the frame features to both the merger 260 and the classifier 270. The merger 260 extracts statistics, referred to as current segment statistics, from the frame features of the current segment. The classifier 270 uses the frame features to build up model scores $\hat{s}_{current,c}$ for the current segment in order to make a classification decision in the manner described with reference to classifier 240.

The controller 250 also notifies the merger 260 and classifier 270 when a boundary of the current segment has been found by the segmenter 230. The first time the merger 260 receives notification that the boundary of the current (first) segment has been found, the merger 260 saves the current segment statistics as potential segment statistics, and clears the current segment statistics. The merger 260 then notifies the controller 250 that a potential segment has been found. The controller 250, upon receipt that a potential segment has been found, notifies the same to the classifier 270. The classifier 270 responds to the notification from the controller 250 by saving the model scores $\hat{s}_{current,c}$ of the current segment into model scores $\hat{s}_{potential,c}$ of the potential segment. The classifier 270 also clears the model scores $\hat{s}_{current,c}$ of the current segment.

When the merger 260 receives notification that the boundary of a subsequent current segment has been found, the merger 260 determines whether the then current segment should be merged with the preceding segment characterised by the potential segment statistics. In other words, the validity of the end boundary of the preceding segment is verified by the merger 260.

In the case where a Laplacian event model is used by the merger 260 the frame features for all frames of the current and preceding segments have to be stored in memory. However, if a Gaussian event model is used, the merger 260 only needs to maintain the number N of frames in the current and preceding segments and the covariance σ of the segmentation features $f_s(i)$ for the current and preceding segments, which may be calculated incrementally within fixed memory.

Starting off with Equation (9), the maximum log likelihood may be rewritten in terms of the number N of frames in the respective segment and the covariance a of the segmentation features $f_s(i)$ of that segment, without referring to individual segmentation features $f_s(i)$ as follows:

$$\log(L) = -\frac{N}{2}\log(2\sigma^2) - \frac{N}{2} \tag{35}$$

The covariance σ is calculated incrementally using:

$$\sigma^2 = \frac{\sum f_i(s)^2}{N} - \frac{\left(\sum f_i(s)\right)^2}{N^2}, \tag{36}$$

The three terms $\sigma f_s(i)^2$, $\sigma f_s(i)$ and N are updated each time segmentation features $f_s(i)$ of frames are received by the merger 260. Initially each of the variables sumX, sumXSquare and N are set to zero. Each time segmentation features $f_s(i)$ of frames are received by the merger 260, these variables sumX, sumXSquare and N are updated as follows:

$$\text{sum}X = \text{sum}X + f_s(i)$$

$$\text{sum}X\text{Square} = \text{sum}X\text{Square} + f_s(i)^2$$

$$N = N + 1 \tag{37}$$

The covariance σ is then calculated as:

$$\sigma^2 = \frac{sumXSquare}{N} - \frac{sumX}{N^2} \tag{38}$$

which provides a complete set of variables to evaluate Equation (35). When a new boundary is detected, the criterion difference ΔBIC is calculated by first calculating:

$$\sigma_{current}^2 = \frac{sumXSquare_{current}}{N_{current}} - \frac{sumX_{current}}{N_{current}^2} \tag{39}$$

$$\sigma_{potential}^2 = \frac{sumXSquare_{potential}}{N_{potential}} - \frac{sumX_{potential}}{N_{potential}^2}$$

$$\sigma_{overall}^2 = \frac{sumXSquare_{potential} + sumXSquare_{current}}{N_{potential} + N_{current}} - \frac{sumX_{potential} + sumX_{curmet}}{N_{potential}^2 + N_{current}^2}$$

and substituting these values into Equation (35), to get:

$$\log(L_{current}) = -\frac{N_{current}}{2}\log(2\sigma_{current}^2) - \frac{N_{current}}{2} \tag{40}$$

$$\log(L_{potential}) = -\frac{N_{potential}}{2}\log(2\sigma_{potential}^2) - \frac{N_{potential}}{2}$$

$$\log(L_{overall}) = -\frac{N_{current} + N_{potential}}{2}\log(2\sigma_{overall}^2) - \frac{N_{current} + N_{potential}}{2}$$

The log-likelihood ratio R(m) is then calculated as:

$$R(m) = \log(L_{current}) + \log(L_{potential}) - \log(L_{overall}) \tag{41}$$

and the criterion difference ΔBIC as:

$$\Delta BIC(m) = R(m) - \frac{1}{2}\log\left(\frac{N_{current}N_{potential}}{(N_{current} + N_{potential})}\right) \tag{42}$$

The criterion difference ΔBIC is then compared with a significant threshold $h_{merge}$. The significant threshold $h_{merge}$ is a parameter that can be adjusted to change the sensitivity of the determination of whether the segments should be merged. In the preferred implementation the significant threshold $h_{merge}$ has a value of 30.

In the case where the merger 260 determines that the current and preceding segments should be merged based on the current and potential segment statistics, the merger 260 merges the current and preceding segments into the preceding segment by merging the current and potential segment statistics into the potential segment statistics as follows:

$$\mathrm{sum}X_{potential}=\mathrm{sum}X_{potential}+\mathrm{sum}X_{current}$$

$$\mathrm{sum}X\mathrm{Square}_{potential}=\mathrm{sum}X\mathrm{Square}_{potential}+\mathrm{sum}X\text{-}\mathrm{Square}_{current}$$

$$N_{potential}=N_{potential}+N_{current} \tag{43}$$

and clears the current segment statistics. The merger 260 additionally notifies the controller 250 that the current and preceding segments have been merged.

Upon receipt of a notification by the controller 250 from the merger 260 that the current and preceding segments have been merged, the controller 250 notifies the same to the classifier 270. The classifier 270 in turn, upon receipt of the notification from the controller 250, merges the model scores $\hat{s}_{current,c}$ of the current segment with the model scores $\hat{s}_{potential,c}$ of the potential segment and saves the result as the model scores $\hat{s}_{potential,c}$ of the potential segment through:

$$\hat{s}_{potential,c}=\hat{s}_{current,c}+\hat{s}_{potential,c} \tag{44}$$

The model scores ŝcurrent,c of the current segment are also cleared by the classifier 270. No classification decision is produced by the classifier 270 upon merging of the preceding and current segments.

Alternatively, in the case where the merger 260 determines that the current and is preceding segments should not be merged based on the current and potential segment statistics, the merger 260 saves the current segment statistics into the preceding segment statistics as follows:

$$\mathrm{sumX}_{potential}=\mathrm{sumX}_{current}$$

$$\mathrm{sumXSquare}_{potential}=\mathrm{sumXSquare}_{current}$$

$$\mathrm{N}_{potential}=\mathrm{N}_{current} \tag{45}$$

and clears the current segment statistics. The merger 260 additionally notifies the controller 250 that the current and preceding segments have not been merged.

Upon receipt of a notification by the controller 250 from the merger 260 that the current and preceding segments have not been merged, the controller 250 notifies the same to the classifier 270. The classifier 270 in turn, upon receipt of the notification from the controller 250, classifies the preceding segment based on the potential segment model scores $\hat{s}_{potential,c}$ and passes the classification decision to the user interface in the manner described with reference to classifier 240 in FIG. 1. Additionally the classifier 270 saves the model scores $\hat{s}_{current,c}$ of the current segment as the model scores $\hat{s}_{potential,c}$ of the potential segment, and clears the model scores $\hat{s}_{current,c}$ of the current segment.

It is noted that the two-pass segmentation and classification system 290 introduces an unbounded delay between when a segment boundary is detected and when the classification of the segment is reported. This is because, when a segment boundary is detected, the system 290 still has to decide whether the segment defined by the segment boundary is a finalized segment. This decision is delayed until a subsequent segment has been detected, and the merger 260 has unsuccessfully tried to merge the two segments. In the case where the two segments are merged, the preceding segment is expanded to include the newest segment and no classification is reported. Since segments have arbitrary length, it is not possible to predict when the system 290 will detect the following segment and be able to test whether the two segments need to be merged.

In cases where the unbounded delay between when a segment boundary is detected and when the segment classification is reported is undesirable, the unbounded delay may be avoided by specifying a maximum length for any segment. This would place an upper bound on the latency.

Applications of the segmentation and classification systems 200 and 290 will now be described. In a first application the segmentation and classification systems 200 and 290 form part of an improved security apparatus. Most simple security systems today record all data that is received thereby. This approach is very costly in terms of the storage space requirements. When the need arises to go through the data, the massive amounts of data recorded makes the exercise prohibitive. Accordingly, the improved security apparatus discards data considered uninteresting.

The proposed improved security system receives audio/visual data (AV data) through connected capture devices. Each of the audio and video data is then analysed separately for "interesting" events. For example, motion detection may be performed on the video data.

The audio data received by the improved security system is further processed by either of the segmentation and classification systems 200 and 290 to segment the audio data into segments and to classify each segment into one of the available classes, or as unknown, where some of the available classes have been marked as interesting for capture. The interesting segments of the AV data are then written to permanent storage.

The improved security system uses a buffer, called an unclassified buffer, to store the current segment while that segment is being classified. Since segments can be potentially arbitrarily long, and the final classification is not reported until the segment is completed, the size of the buffer is substantial.

The size of the unclassified buffer may be reduced with the use of the preliminary classification. The preliminary classification gives the improved security system an indication of what the classification is most likely to be, and this information may be utilised in a variety of ways, some of which are explored below:

1) The improved security system may discard all data until it receives at least a preliminary classification. If this preliminary classification is consistently interesting, there is a fair chance that the entire segment will be classified as interesting. In this case the system writes the data directly to permanent storage, thereby avoiding buffering the data.

2) The improved security system may store the audio/video data using a varying level of data loss, with the level of data loss depending on what percentage of the portion had an interesting classification.

3) Depending on the length of segments, the improved security system may save only interesting portions of segments, i.e. portions having a preliminary classification of interesting.

The most suitable option will depend on a trade-off between the cost of buffering data, and how much data loss can be safely tolerated.

Another application of the segmentation and classification systems 200 and 290 is filtering of an input to a speech recognition system. Most simple speech recognition systems treat all input as potential speech. Such systems then try to recognise all types of audio data as speech and this causes mis-recognition in many cases. The speech recognition system using either of systems 200 and 290 first classifies all received sound as either speech or non-speech. All non-speech data is discarded, and recognition algorithms are run on portions of audio classified as speech, resulting in better results. This is especially useful in speech to text systems.

The foregoing describes only some embodiments of the present invention, and modifications and/or changes can be made thereto without departing from the scope and spirit of the invention, the embodiment(s) being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

The claims defining the invention are as follows:

1. A computer implemented method of controlling at least one processor to classify segments of a signal, said method comprising controlling the at least one processor to perform the steps of:

(a) receiving a sequence of segmentation feature data, each of said feature data characterizing a frame of data along said signal;

(b) in response to receipt of each of said feature data of a current segment, updating current statistical data, characterizing said current segment, with the received feature data;

(c) determining a preliminary classification for said current segment from said updated statistical data before receipt of a notification of an end boundary of said current segment;

(d) storing said current segment in a storage device based on the preliminary classification of the current segment;

(e) receiving a notification of the end boundary of said current segment;

(f) in response to receipt of said notification, comparing said updated statistical data with statistical data characterizing a preceding segment;

(g) merging said current and preceding segments, or classifying said preceding signal segment based on said statistical data characterizing said preceding segment, based upon the difference between said updated statistical data and said statistical data characterizing said preceding segment; and (h) merging said updated statistical data and said statistical data characterizing said preceding segment, wherein said statistical data used for said comparing step is updated from a function of an energy value of a component frame, a bandwidth of said component frame, and a frequency centroid of said component frame, and said function is a product of said energy value with a weighted sum of said bandwidth and said frequency centroid.

2. The method as claimed in claim 1 wherein said preceding segment is classified as matching one of a plurality of classification categories, with each classification category being defined by a predefined model, or as not matching any one of said classification categories.

3. The method as claimed in claim 1 wherein said feature data is discarded once said statistical data has been updated.

4. The method as claimed in claim 1 wherein said feature data is a feature vector.

5. The method as claimed in claim 1 wherein, if the difference between said updated statistical data and said statistical data characterizing said preceding segment is below a threshold, the method further comprises merging said current and preceding segments, and if the difference between said updated statistical data and said statistical data characterizing said preceding segment is above said threshold, the method further comprises classifying said preceding signal segment.

6. An apparatus for classifying segments of a signal, said apparatus comprising:

first input means for receiving a sequence of segmentation feature data, each of said feature data characterizing a frame of data along said signal;

updating means for updating current statistical data, characterizing said current segment, with a received feature data in response to receipt of each of said feature data of a current segment;

determining means for determining a preliminary classification for said current segment from said updated statistical data before receipt of a notification of an end boundary of said current segment;

storing means for storing said current segment based on the preliminary classification of the current segment;

second input means for receiving a notification of the end boundary of said current segment;

comparing means for comparing said updated statistical data with statistical data characterizing a preceding segment in response to receipt of said notification;

merging means for merging said current and preceding segments if the difference between said updated statistical data and said statistical data characterizing said preceding segment is below a threshold;

classifying means for classifying said preceding signal segment based on said statistical data characterizing said preceding segment if said difference is above said threshold; and means for merging said updated statistical data and said statistical data characterizing said preceding segment, wherein said statistical data used for said comparing means is updated from a function of an energy value of a component frame, a bandwidth of said component frame, and a frequency centroid of said component frame, and said function is a product of said energy value with a weighted sum of said bandwidth and said frequency centroid.

7. A non-transitory computer readable storage medium, having a program recorded thereon, where the program is configured to make a computer execute a procedure to classify segments of a signal, said procedure comprising the steps of:

(a) receiving a sequence of segmentation feature data, each of said feature data characterizing a frame of data along said signal;

(b) in response to receipt of each of said feature data of a current segment, updating current statistical data, characterizing said current segment, with the received feature data;

(c) determining a preliminary classification for said current segment from said updated statistical data before receipt of a notification of an end boundary of said current segment;

(d) storing said current segment based on the preliminary classification of the current segment;

(e) receiving a notification of the end boundary of said current segment;

(f) in response to receipt of said notification, comparing said updated statistical data with statistical data characterizing a preceding segment;

(g) merging said current and preceding segments, or classifying said preceding signal segment based on said statistical data characterizing said preceding segment, based upon the difference between said updated statistical data and said statistical data characterizing said preceding segment; and (h) merging said updated statistical data and said statistical data characterizing said preceding segment, wherein said statistical data used for said comparing step is updated from a function of an energy value of a component frame, a bandwidth of said component frame, and a frequency centroid of said component frame, and said function is a product of said energy value with a weighted sum of said bandwidth and said frequency centroid.

8. A computer implemented method of controlling at least one processor to classify segments of an audio signal, said method comprising controlling the at least one processor to perform the steps of:

(a) receiving a sequence of segmentation feature data, each of said feature data characterizing a corresponding frame of data along said audio signal;

(b) in response to receipt of each of said feature data of a current segment, updating current statistical data, characterizing said current segment, with the received feature data and discarding the corresponding frame of data along said audio signal;

(c) discarding said received feature data once the current statistical data is updated;

(d) receiving a notification of an end boundary of said current segment;

(e) in response to receipt of said notification, comparing said updated current statistical data with statistical data characterizing a preceding segment;

(f) merging said current and preceding segments, or classifying said preceding signal segment based on said statistical data characterizing said preceding segment, based upon the difference between said updated current statistical data and said statistical data characterizing said preceding segment; and (g) merging said updated statistical data and said statistical data characterizing said preceding segment, wherein said statistical data used for said comparing step is updated from a function of an energy value of a component frame, a bandwidth of said component frame, and a frequency centroid of said component frame, and said function is a product of said energy value with a weighted sum of said bandwidth and said frequency centroid.

9. A computer implemented method for controlling at least one processor to process an audio signal, said method comprising controlling the at least one processor to perform the steps of:

(a) providing a pre-trained model;

(b) providing an audio signal for processing in accordance with said models;

(c) segmenting said audio signal into homogeneous portions whose length is not limited by a predetermined constant, wherein each portion comprises at least first and second sets of frames; and (d) classifying at least one of the homogeneous portions with reference to the pre-trained model by merging statistical data corresponding to the first set of frames with a statistical data corresponding to the second set of frames, wherein the statistical data is determined from a function of an energy value of a component frame, a bandwidth of said component frame, and a frequency centroid of said component frame, and said function is a product of said energy value with a weighted sum of said bandwidth and said frequency centroid;

wherein said classifying step begins classification of a homogeneous portion before said segmenting step has identified the end of said homogeneous portion.

10. The method according to claim 9 wherein the classification of a homogeneous portion completes within a fixed time after the end of said portion has been determined.

11. The method according to claim 9 wherein said classifying step further reports at least one preliminary classification of a homogeneous portion prior to the end of said portion has been determined.

12. The method according to claim 9 wherein said classifying step classifies a homogeneous portion either as consistent with one of said models or as not consistent with any of said models.

13. The method according to claim 9 wherein said segmenting step is performed independently of said pre-trained models.

14. A computer implemented method of controlling at least one processor to segment an audio signal into a series of homogeneous portions, said method comprising controlling the at least one processor to perform the steps of:

receiving input consisting of a sequence of frames, each frame consisting of a sequence of signal samples;

calculating feature data for each said frame, forming a sequence of calculated feature data each corresponding to one of said frames;

in response to receipt of each said calculated feature data of a current segment, updating current statistical data with the received feature data, said current statistical data characterizing said current segment;

determining a preliminary classification for said current segment from said updated statistical data before determination of an end boundary of said current segment;

storing the current segment based on the preliminary classification of the signal segment;

in response to a determination of a potential end boundary, comparing said current statistical data with statistical data characterizing a preceding segment;

merging said stored current and preceding segments, or accepting said preceding segment as a completed segment, based upon the difference between said updated statistical data and said statistical data characterizing said preceding segment; and merging said updated statistical data and said statistical data characterizing said preceding segment, wherein said current statistical data used for said comparing step is updated from a function of an energy value of a component frame, a bandwidth of said component frame, and a frequency centroid of said component frame, and said function is a product of said energy value with a weighted sum of said bandwidth and said frequency centroid.

15. The method according to claim 14, wherein said calculated feature data is discarded once said statistical data has been updated.

16. The method as claimed in claim 14 wherein said feature data is a feature vector.

17. A computer implemented method of controlling at least one processor to segment and classify an audio signal into a series of homogeneous portions, said method comprising controlling the at least one processor to perform the steps of:

receiving input consisting of a sequence of frames, each frame consisting of a sequence of signal samples;

calculating feature data for each said frame, forming a sequence of calculated feature data each corresponding to one of said frames;

in response to receipt of each said calculated feature data of a current segment, updating current statistical data with the received feature data, said current statistical data characterizing said current segment;

determining a preliminary classification for said current segment from said updated statistical data before determination of a potential end boundary of said current segment;

storing the current segment based on the preliminary classification of the current segment;

in response to a determination of a potential end boundary, comparing said updated statistical data with statistical data characterizing a preceding segment;

merging the stored current and preceding segments, or accepting the preceding segment as a completed segment and classifying said completed segment, based on the difference between said updated statistical data and said statistical data characterizing said preceding segment; and merging said updated statistical data and said statistical data characterizing said preceding segment, wherein said current statistical data used for said comparing step is updated from a function of an energy value of a component frame, a bandwidth of said component frame, and a frequency centroid of said component frame, and said function is a product of said energy value with a weighted sum of said bandwidth and said frequency centroid.

18. The method according to claim 17 wherein said completed segment is classified as matching one of a plurality of classification categories, with each classification category being defined by a predefined model.

19. The method according to claim 17 wherein said completed segment is classified as matching one of a plurality of classification categories, with each classification category being defined by a predefined model, or as not matching any one of said classification categories.

20. The method according to claim 17, wherein said calculated feature data are discarded once said statistical data has been updated.

21. The method as claimed in claim 17 wherein said feature data is a feature vector.

22. The method as claimed in claim 17 wherein, if the difference between said updated statistical data and said statistical data characterizing said preceding segment is below a threshold, then merging said current and preceding segments and if the difference between said updated statistical data and said statistical data characterizing said preceding segment is above said threshold, then classifying said preceding signal segment.

23. A computer implemented method of controlling at least one processor to classify a signal segment, said signal segment comprising a plurality of sets of frames, said method comprising the steps of:

(a) for each of at least two sets of frames, receiving a model score, wherein each model score is based on feature data corresponding to the set of frames with respect to a pre-trained model, wherein said model score is updated from a function of an energy value of a component frame, a bandwidth of said component frame, and a frequency centroid of said component frame, and said function is a product of said energy value with a weighted sum of said bandwidth and said frequency centroid;

(b) determining, using the at least one processor, a classification model score for the signal segment with respect to the pre-trained model by merging the received model scores before receiving a notification of an end boundary of said signal segment; and (c) upon receipt of the notification of the end boundary of the signal segment, classifying the signal segment with respect to the pre-trained model based on the determined classification model score.

* * * * *